(12) United States Patent
Levy-Yurista et al.

(10) Patent No.: US 10,382,282 B1
(45) Date of Patent: Aug. 13, 2019

(54) DISCOVERY OF USERS USING WIRELESS COMMUNICATIONS

(71) Applicant: MicroStrategy Incorporated, Vienna, VA (US)

(72) Inventors: Guy Levy-Yurista, Vienna, VA (US); Diego Valenzuela, Vienna, VA (US); Liang Liu, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 390 days.

(21) Appl. No.: 14/793,488

(22) Filed: Jul. 7, 2015

Related U.S. Application Data

(60) Provisional application No. 62/021,474, filed on Jul. 7, 2014.

(51) Int. Cl.
*H04W 8/00* (2009.01)
*H04L 12/24* (2006.01)
*G06F 3/0484* (2013.01)

(52) U.S. Cl.
CPC .......... *H04L 41/12* (2013.01); *G06F 3/04842* (2013.01); *G06F 3/04847* (2013.01); *H04L 41/22* (2013.01); *H04W 8/005* (2013.01)

(58) Field of Classification Search
CPC ........ H04W 4/008; H04W 8/005; H04L 41/12
See application file for complete search history.

(56) References Cited

U.S. PATENT DOCUMENTS

| | | |
|---|---|---|
| 6,661,340 B1 | 12/2003 | Saylor |
| 7,356,840 B1 | 4/2008 | Bedell |
| 8,127,326 B2 | 2/2012 | Claussen |
| 8,522,192 B1 | 8/2013 | Avalos |
| 8,732,853 B1 | 5/2014 | Byrne |
| 8,775,807 B1 | 7/2014 | Vazquez |
| 8,886,128 B2 | 11/2014 | Hubner |
| 9,027,099 B1 | 5/2015 | Saylor |
| 9,160,727 B1 | 10/2015 | Saylor |
| 9,172,699 B1 | 10/2015 | Vazquez |

(Continued)

OTHER PUBLICATIONS

U.S. Office Action issued in U.S. Appl. No. 15/006,300, dated Jan. 11, 2018, 12 pages.

(Continued)

*Primary Examiner* — Jeong S Park
(74) *Attorney, Agent, or Firm* — Fish & Richardson P.C.

(57) ABSTRACT

An application executed on a first device presents a user interface on a device display. The application is associated with a validation system used by the device. Based on receiving a first user input, the application controls the first device to scan, using a first communication protocol, for other devices that are located within a first communication range of the first device. Based on the scan, the application discovers a second device located within the first communication range of the first device. The application receives, from the second device, an identification information that uniquely identifies a user associated with the second device on the validation system. The application validates the identification information by communicating with a validation server. Based on validating the identification information, the application displays an indication that the second device associated with the user is located within the first communication range of the first device.

22 Claims, 14 Drawing Sheets

(56) References Cited

U.S. PATENT DOCUMENTS

| | | |
|---|---|---|
| 9,413,794 B1 | 8/2016 | Saylor |
| 2003/0101201 A1 | 5/2003 | Saylor |
| 2005/0242946 A1 | 11/2005 | Hubbard, Jr. |
| 2006/0265266 A1 | 11/2006 | Chen |
| 2007/0054739 A1 | 3/2007 | Amaitis |
| 2008/0319768 A1 | 12/2008 | Kreiner |
| 2009/0046677 A1 | 2/2009 | Toledano |
| 2010/0019921 A1 | 1/2010 | Kreiner |
| 2010/0063889 A1* | 3/2010 | Proctor, Jr. .......... H04W 4/029 705/21 |
| 2010/0146078 A1* | 6/2010 | Wolff ................. H04L 12/1822 709/219 |
| 2011/0037712 A1* | 2/2011 | Kim .................... H04M 1/7253 345/173 |
| 2011/0167357 A1* | 7/2011 | Benjamin ........... H04L 12/1818 715/753 |
| 2012/0149309 A1 | 6/2012 | Hubner |
| 2013/0006749 A1* | 1/2013 | Fink .................. G06Q 30/0207 705/14.39 |
| 2013/0061296 A1 | 3/2013 | Reddy |
| 2013/0176142 A1 | 7/2013 | Drysdale |
| 2014/0162601 A1* | 6/2014 | Kim ...................... H04W 12/06 455/411 |
| 2014/0192737 A1* | 7/2014 | Belghoul .............. H04W 4/023 370/329 |
| 2014/0344252 A1 | 11/2014 | Kapoor |
| 2015/0199442 A1 | 7/2015 | Hahn |
| 2015/0222639 A1 | 8/2015 | Dulkin |
| 2015/0263833 A1 | 9/2015 | Li |
| 2016/0063558 A1* | 3/2016 | Kim ..................... H04W 8/005 705/14.54 |
| 2017/0134901 A1 | 5/2017 | Uyanik |

OTHER PUBLICATIONS

U.S. Office Action issued in U.S. Appl. No. 15/006,300, dated Jul. 25, 2018, 21 pages.

* cited by examiner

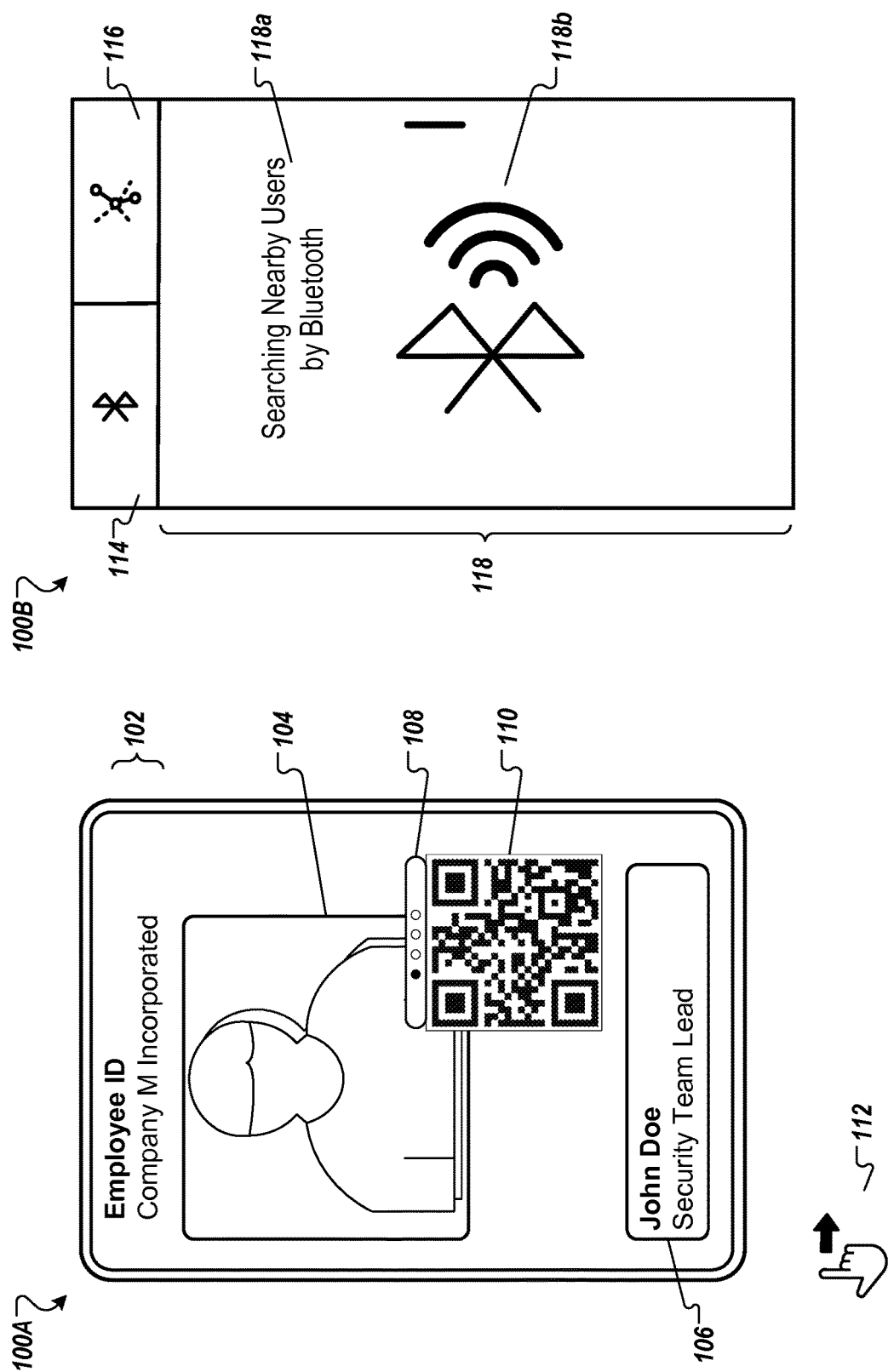

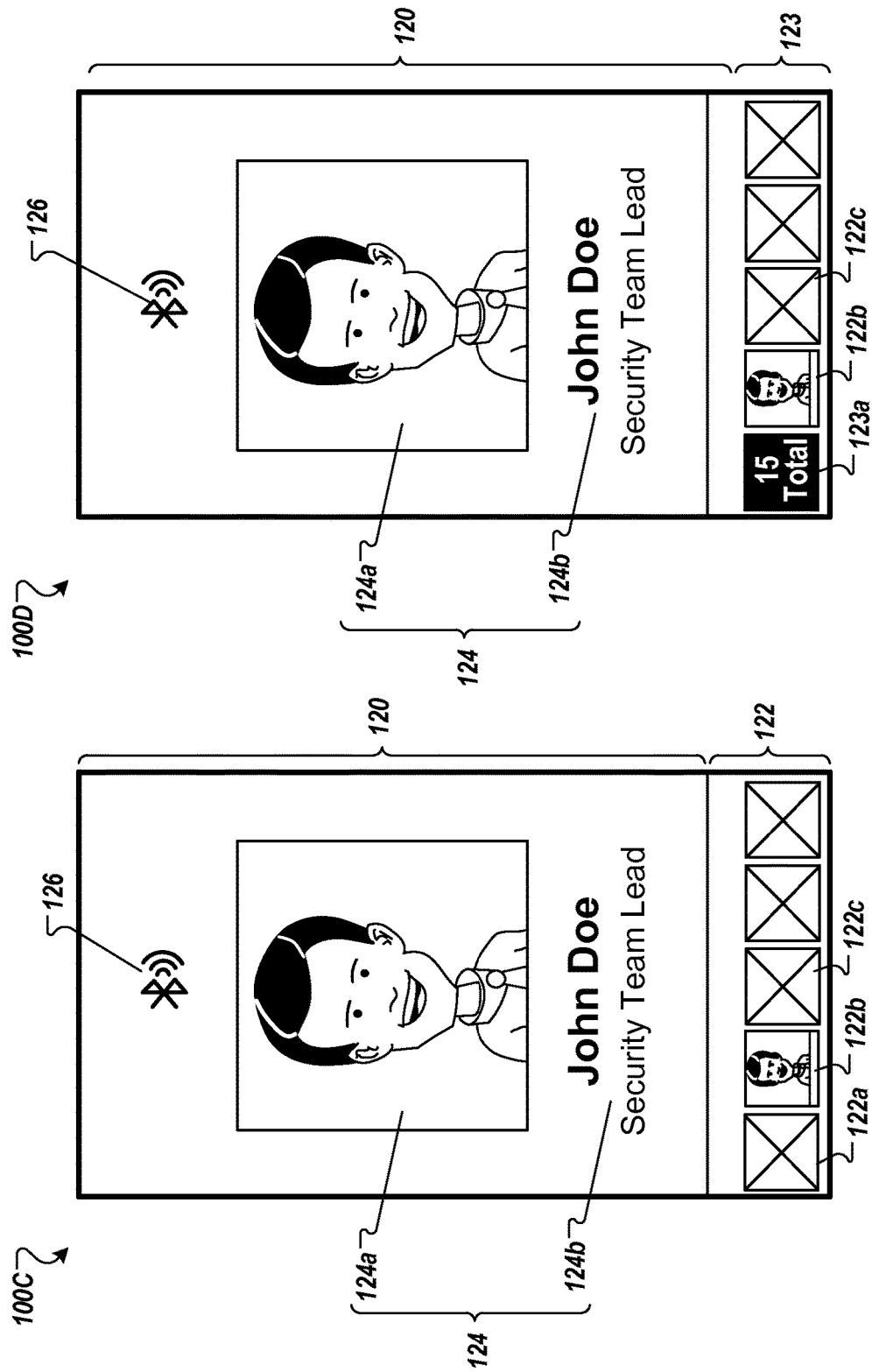

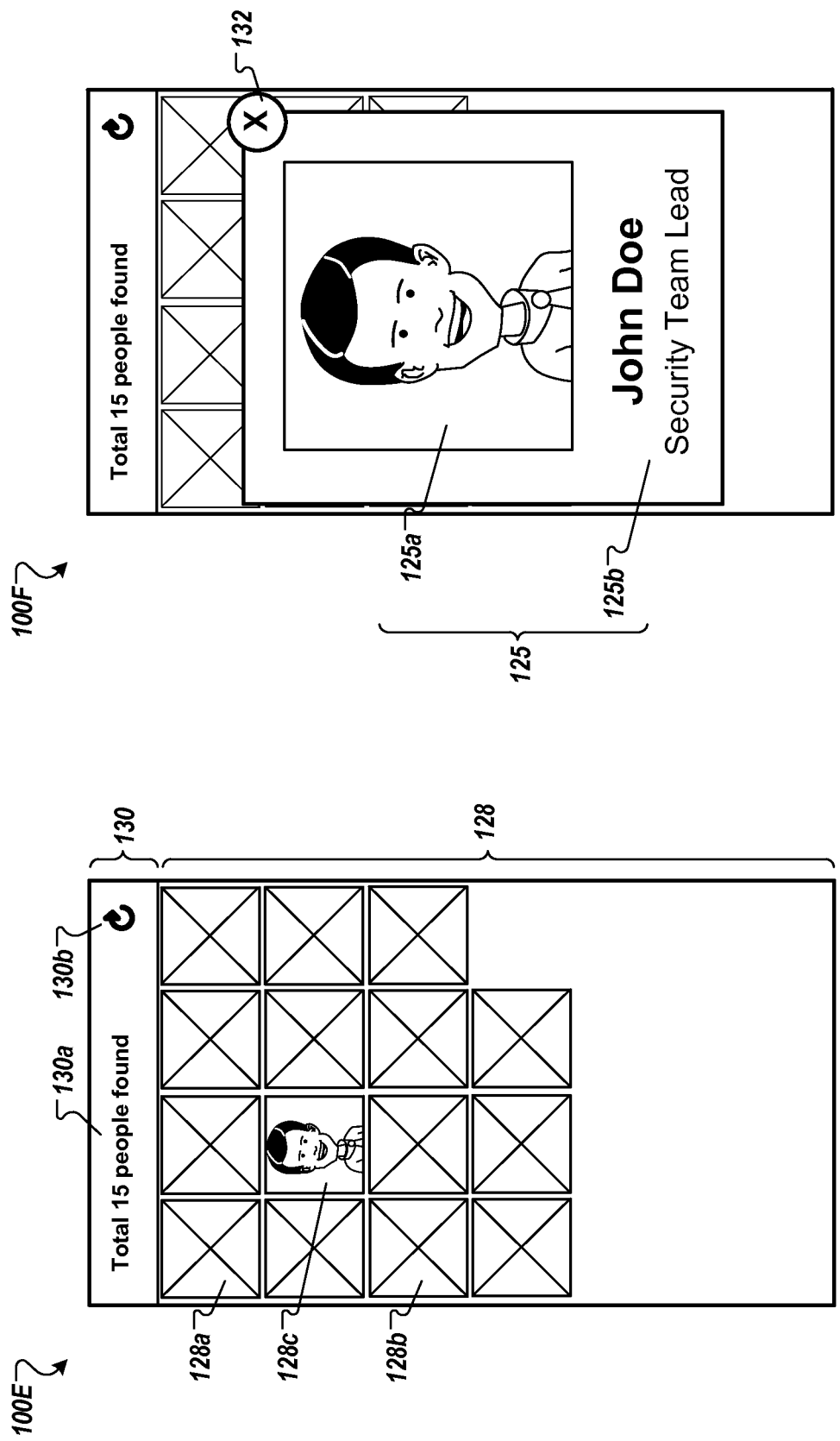

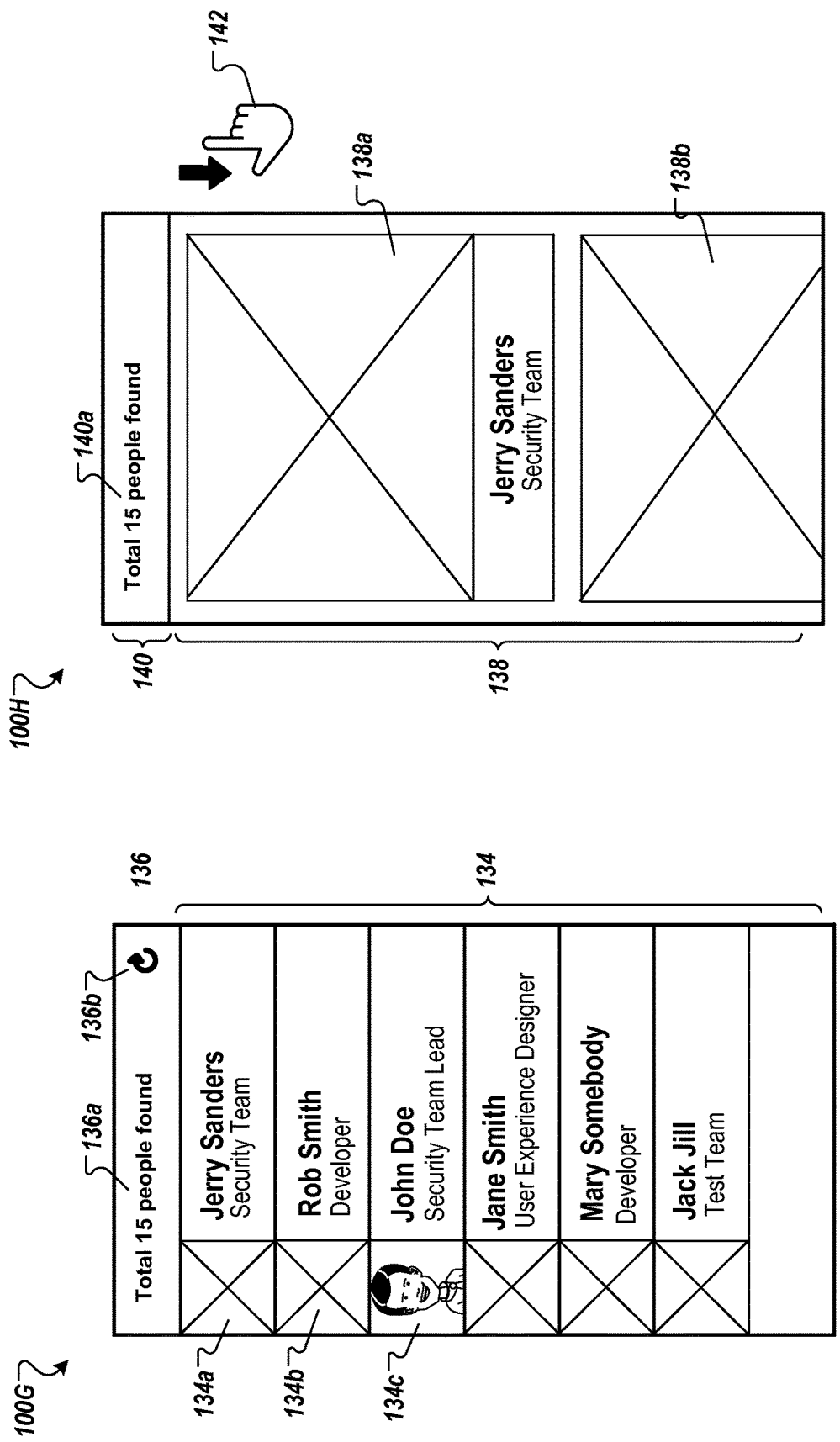

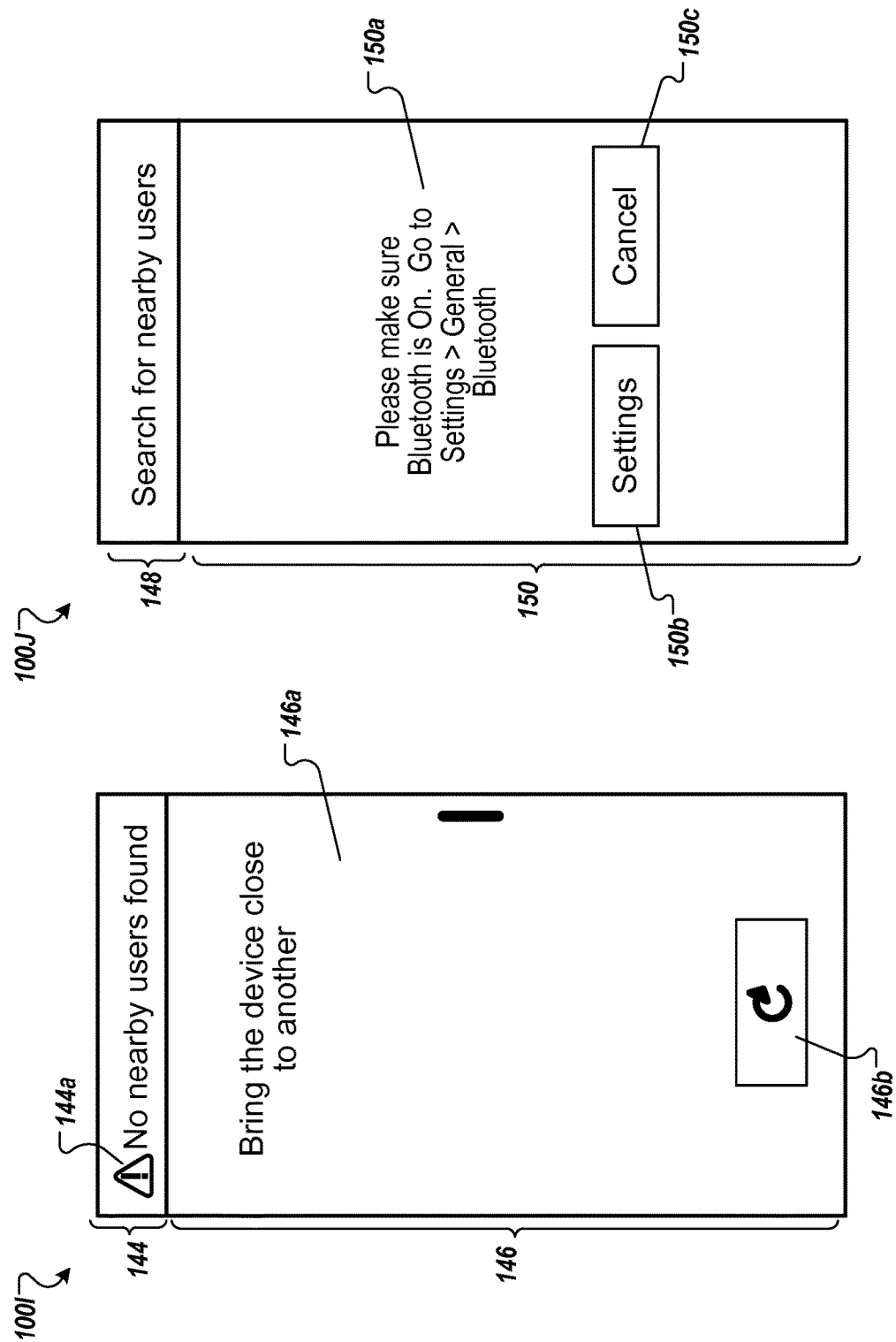

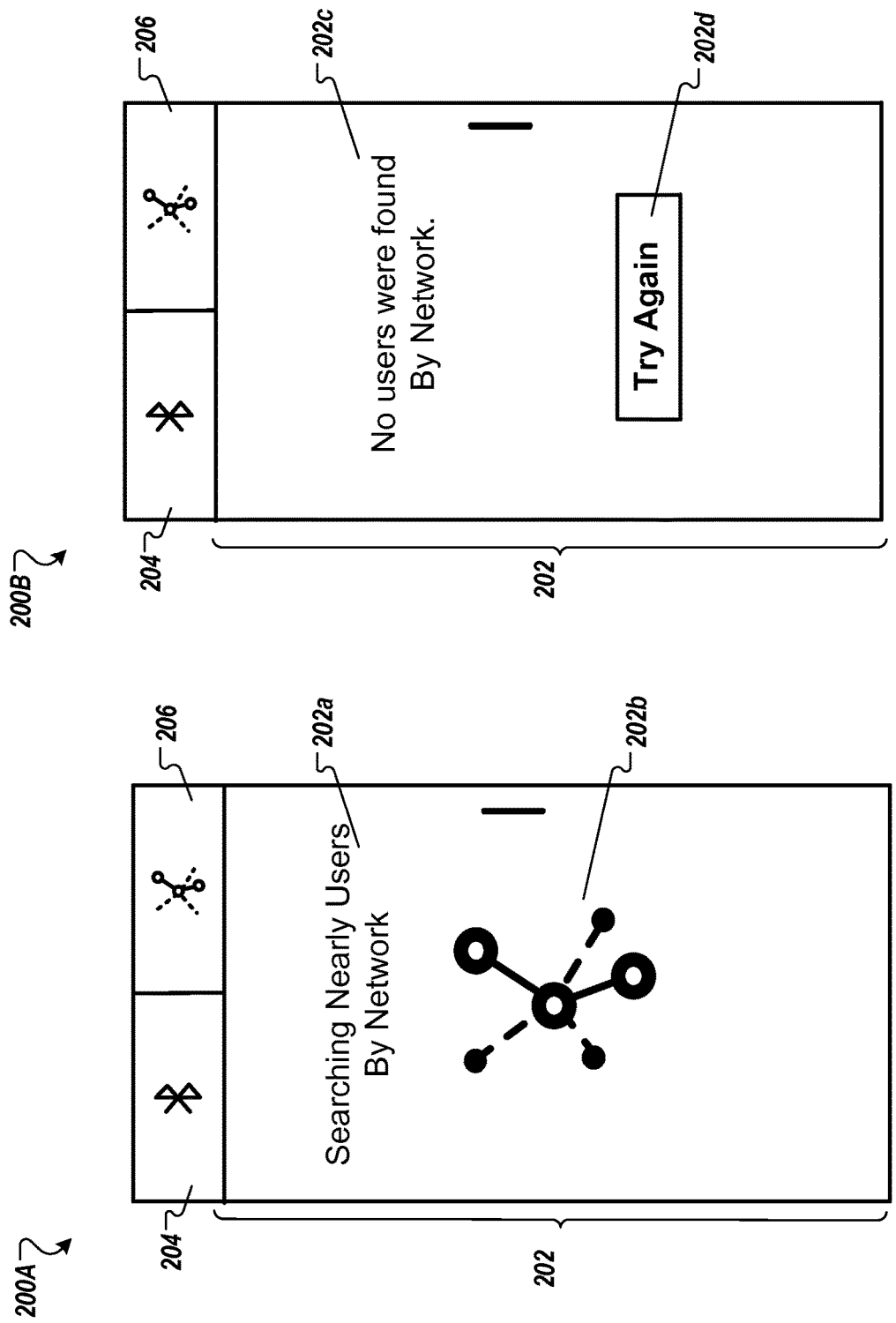

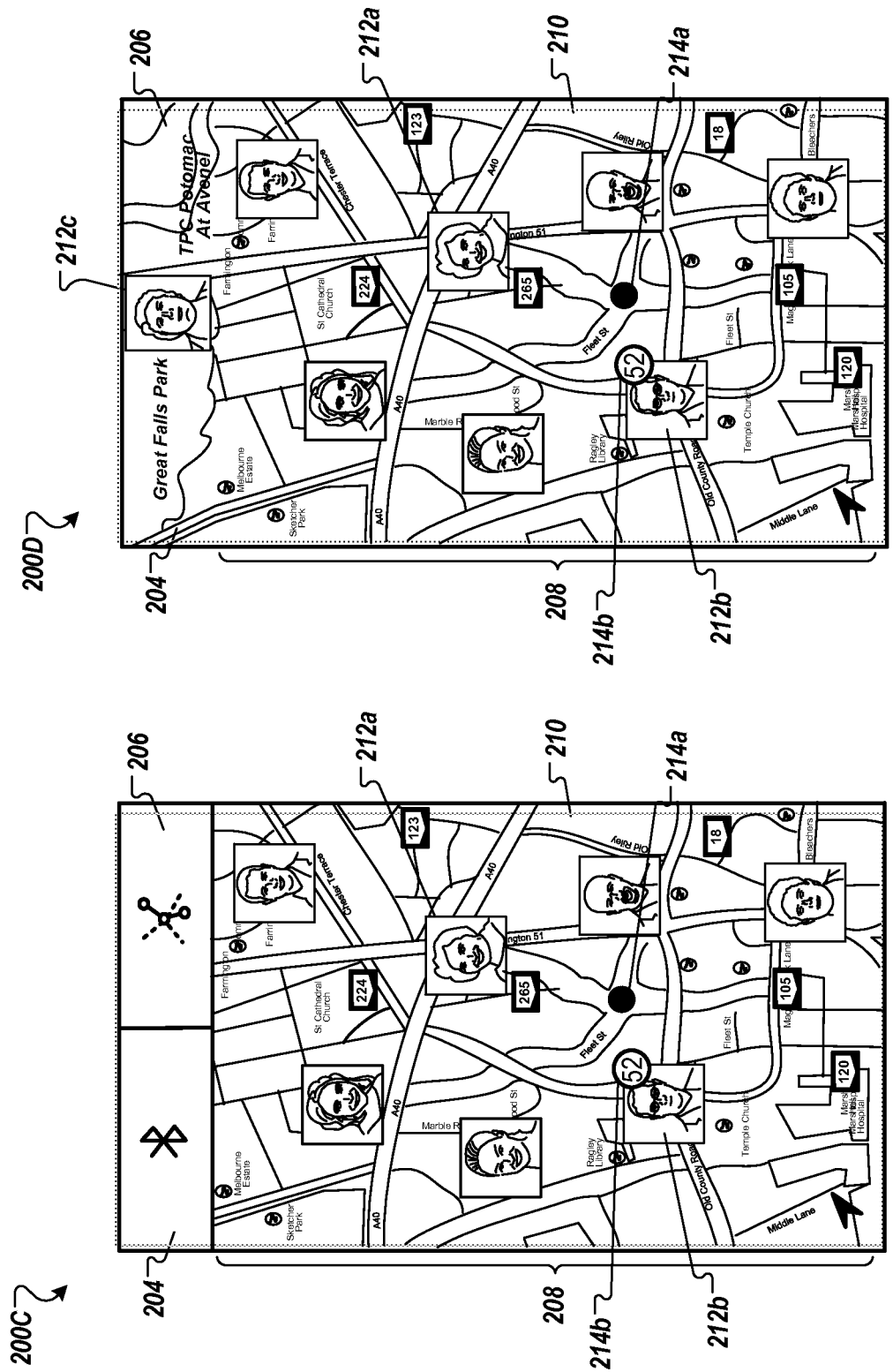

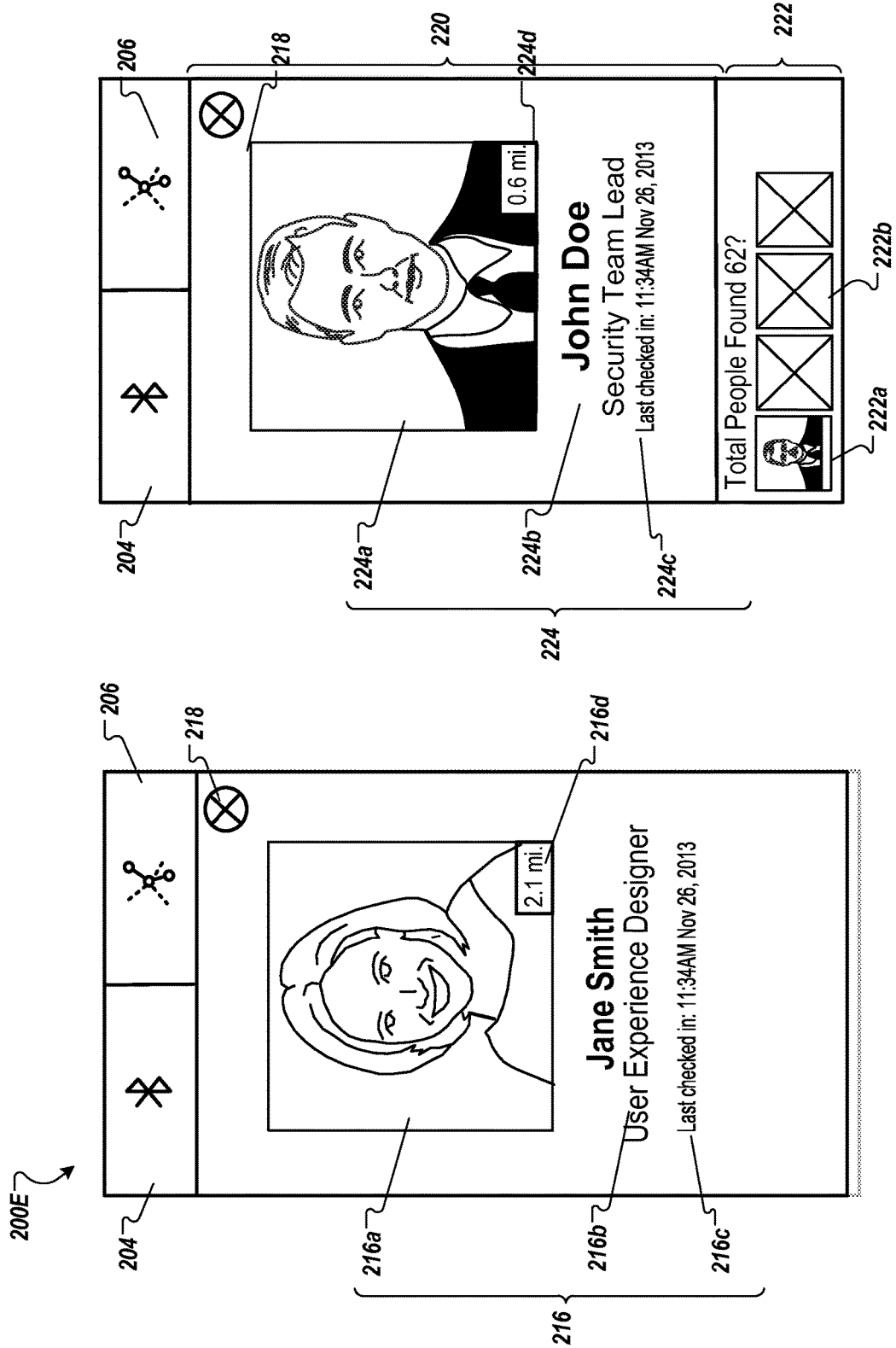

DISCOVERY OF USERS USING WIRELESS COMMUNICATIONS

CROSS-REFERENCE TO RELATED APPLICATION

This application claims priority from U.S. Provisional Application No. 62/021,474, filed Jul. 7, 2014, and titled "Finding Users," which is incorporated by reference.

TECHNICAL FIELD

This specification generally relates to finding users.

BACKGROUND

A user may be associated with a credential that, for example, permits the user to be identified to others. The credential may be stored in an electronic device associated with the user.

SUMMARY

In one aspect, an application executed on a first device presents a user interface on a display coupled to the first device, wherein the application is associated with a validation system used by the device. A first user input is received through the application user interface. The first user input initiates a search for other devices that are associated with the validation system and that are located within a first communication range of the first device that enables exchange, with the first device, of direct wireless communications using a first communication protocol.

Based on receiving the first user input, the application controls the first device to scan, using the first communication protocol, for other devices that are located within the first communication range of the first device that enables exchange, with the first device, of direct wireless communications using the first communication protocol. Based on the scan, the application discovers a second device that is located within the first communication range of the first device and that is broadcasting, over the first communication protocol, an identifier that indicates association with the validation system. The identifier that is broadcast by the second device includes identification information that corresponds to a user associated with the second device and that uniquely identifies the user on the validation system.

The application executing on the first device receives the identifier that is broadcast from the second device during the scan and extracts the identification information included in the identifier. The application executing on the first device validates the identification information by communicating with a validation server associated with the validation system. Based on validating the identification information, the application executing on the first device displays an indication that the second device associated with the user is located within the first communication range of the first device.

Particular implementations may include one or more of the following features. The first communication protocol may be a Bluetooth-based communication protocol and the identifier that is broadcast by the second device may include one or more Universally Unique Identifiers (UUIDs). The identification information that is included in the identifier may include a combination of UUIDs, selected from among a subset of possible UUIDs.

In another aspect, an application executed on a first device presents a user interface on a display coupled to the first device, wherein the application is associated with a validation system used by the device. A first user input is received through the application user interface. The first user input initiates a search for other devices that are associated with the validation system and that are located within a first communication range of the first device that enables exchange, with the first device, of direct wireless communications using a first communication protocol.

Based on receiving the first user input, the application controls the first device to scan, using the first communication protocol, for other devices that are located within the first communication range of the first device that enables exchange, with the first device, of direct wireless communications using the first communication protocol. Based on the scan, the application discovers a second device that is located within the first communication range of the first device and that is broadcasting, over the first communication protocol, an identifier that indicates association with the validation system.

The application receives, from the second device, an identification information that corresponds to a user associated with the second device and that uniquely identifies the user on the validation system. The application executing on the first device validates the identification information by communicating with a validation server associated with the validation system. Based on validating the identification information, the application executing on the first device displays an indication that the second device associated with the user is located within the first communication range of the first device.

Particular implementations may include one or more of the following features. Controlling the first device to scan for other devices based on receiving the first user input may include displaying, on the application user interface, an animation providing information indicating that the first device is searching for other devices using the first communication protocol. In response to receiving the identification information that corresponds to the user associated with the second device, the application may display the identification information on the application user interface. The application may present a smaller version of the animation on the application user interface in conjunction with displaying the identification information.

The validation server may be remotely located. Validating the identification information by communicating with the validation server may include sending, by the application, the identification information to the validation server over a network connection. The application may receive, from the validation server, a response indicating that the identification information is actively associated with the validation system. The response may include additional information identifying the second device user.

The application may discover, based on controlling the first device to scan within the first communication range using the first communication protocol, additional devices in the within the first communication range that are associated with the validation system. The application may display, on the application user interface, information indicating that additional devices are discovered, along with displaying the identification information corresponding to the second device user. The application may receive, from the additional devices, identification information corresponding to users associated with the additional devices and that uniquely identifies the users on the validation system. The application may validate the identification information by communicating with the validation server. Based on validating the identification information, the application may display thumbnails associated with the identification information corresponding to the users of the additional devices while the identification information corresponding to the second device user is displayed along with the additional information identifying the second device user.

Displaying the information indicating that additional devices are discovered may include displaying placeholder icons on the application user interface adjacent to the displayed identification information corresponding to the second device user, and providing information on a number of the additional devices discovered.

The number of the additional devices discovered may be limited to a predetermined number. The application may determine that the number of the additional devices discovered has reached the predetermined number. Based on determining that the number of the additional devices discovered has reached the predetermined number, the application may control the first device to cease scanning the first communication range.

Based on the scan, the application may discover a third device that is located within the first communication range of the first device and that is broadcasting, over the first communication protocol, an information association with the validation system. The application may receive, from the third device, identification information corresponding to a user associated with the third device and that uniquely identifies the user on the validation system along with additional information identifying the third device user. The application may determine that a network connection with the validation server cannot be established. Based on determining that the network connection with the validation server cannot be established, the application executing on the first device may validate the identification information corresponding to the third device user using the additional information identifying the third device user. Based on validating the identification information, the application may display the identification information on the application user interface.

The application may receive, through the application user interface, a new user input that initiates another search for other devices that are associated with the validation system and that are located within the first communication range of the first device that enables exchange, with the first device, of direct wireless communications using the first communication protocol. Based on receiving the new user input, the application may control the first device to scan, using the first communication protocol, for other devices that are located within the first communication range of the first device that enables exchange, with the first device, of direct wireless communications using the first communication protocol.

Based on the scan, the application may determine that there are no other devices associated with the validation system in the first communication range. The application may display, on the application user interface, information indicating that no other devices associated with the validation system are found in the first communication range.

The application may receive, through the application user interface, a second user input for that initiates a new search for other devices that are associated with the validation system and that are located in a geographic area within a second communication range of the first device that is greater than the first communication range. Based on receiving the second user input, the application may control the first device to send a message to the validation server, using a second communication protocol. The message may include a request for information about users of other devices associated with the validation system located in the geographic area within the second communication range of the first device.

The application may receive, using first device, a response from the validation server. The response may include information about users of other devices associated with the validation system that are located in the geographic area within the second communication range of the first device. The application may display the received information about the users of the other devices on the application user interface.

The first user input may be received through a first panel of the application user interface presented on the display coupled to the first device, the first panel associated with the first communication protocol. Receiving the second user input may include receiving, in response to displaying the information indicating that no users of other devices are found in the first communication range of the first device, another user input for switching to a second panel of the application user interface, the second panel associated with the second communication protocol. The application may present the second panel of the application user interface on the display coupled to the first device upon receiving the other user input. The application may receive the second user input through the second panel of the application user interface.

Receiving the response from the validation server including information about users of other devices may include receiving information about users associated with devices that have corresponding locations recorded with the validation server within a predetermined time period from a time of sending the request by the first device. Information received about a user may include one or more of an image associated with the user, a name of the user, a title, location of the associated device last recorded with the validation server along with time and date of the location, or a distance of the associated device from the first device.

The information about the users may be received sorted by distance from the first device, with information about users associated with devices that are closer to the first device received before information about users associated with devices that are farther away from the first device are received.

Displaying the received information about the users of other devices may include displaying, on the application user interface, a map of the geographic area corresponding to the second communication range. The application may present, on the map, thumbnails of the images associated with the users included in the received information from the validation server. The thumbnails may be shown on the map proximate to the recorded locations of the associated devices.

The application may receive a third user input selecting a thumbnail from the thumbnails presented on the map. In response to receiving the third user input, the application may display, as an overlay covering the map, an enlarged representation of the image associated with the user corresponding to the selected thumbnail, along with one or more of the name of the user, the title, last recorded location of the associated device and time and date of the location, or the distance of the associated device from the first device.

Presenting thumbnails of the images associated with the users may include determining that there are multiple users with recorded locations that are within a predetermined proximity range of one another. Based on determining that there are multiple users, the application may select one user among the multiple users. The application may present a thumbnail of the image associated with the selected user on the map proximate to the recorded location of the associated device, along with an icon providing a numerical indication of the multiple users who are within the predetermined proximity range of the selected user indicated by the thumbnail. The application may receive a third user input selecting the thumbnail associated with the selected user. In response to receiving the third user input, the application may display, as an overlay covering the map, an enlarged representation of the image associated with the selected user and the information received about the selected user, along with information on others of the multiple users indicated by the icon.

Information on others of the multiple users indicated by the icon may include thumbnails of images associated with the others of the multiple users. The application may receive a fourth user input selecting a new thumbnail from the thumbnails of images associated with the others of the multiple users. In response to receiving the fourth user input, the application may replace previous enlarged representation of the image and the information received about the selected user, with an enlarged representation of the image and the information received about the user corresponding to the new thumbnail, along with displaying information on remainder of the multiple users.

The first communication protocol may include a personal area network (PAN) communication protocol. The second communication protocol may include a wide area network (WAN) communication protocol.

Implementations of the above may include methods, systems and computer program products. A method may perform one or more of the above described actions. A computer program product may be suitably embodied in a non-transitory machine-readable medium and include instructions executable by one or more processors. The instructions may be configured to cause the one or more processors to perform the above described actions.

A system may comprise a first device that stores first instructions for execution by a first processor coupled to the first device. The first instructions, when executed, may be operable to cause the first processor to perform one or more of the above described actions. The system also may include a validation server that stores second instructions for execution by a second processor coupled to the validation server. The second instructions, when executed, may be operable to cause the second processor to perform one or more of the following operations.

Location information from devices associated with the validation system may be received at the validation server. The location information may be collected from validation calls made by the devices to the validation server for access to resources managed by the validation system. The validation server may record the location information received from the devices, along with information on associated users, in a data structure maintained by the validation server. The validation server may receive the message from the first device including the request for information about users of other devices in the geographic area corresponding to the second communication range of the first device. The validation server may examine the recorded location information for the devices upon receiving the message from the first device. Based on examining the recorded location information, the validation server may determine devices that were in the geographic area corresponding to the second communication range of the first device in a predetermined time interval of the time of receiving the message from the first device. The validation server may send, to the first device, the information about users of the devices that were determined to be in the geographic area corresponding to the second communication range of the first device in the predetermined time interval.

The details of one or more implementations are set forth in the accompanying drawings and the description, below. Other features will be apparent from the description and drawings, and from the claims.

DESCRIPTION OF DRAWINGS

FIGS. 1A-1L show screens displayed by a sample user interface running on a client device that is operable to present representations of credentials and enable searching for other devices that are associated with credentials issued by a common credential issuing organization.

FIGS. 2A-2G show screens displayed by a sample user interface running on a client device that is operable to present representations of credentials and enable searching for other devices associated with credentials issued by a common credential issuing organization.

Like reference symbols in different figures indicate like elements.

DETAILED DESCRIPTION

Figures 1K, 1L:
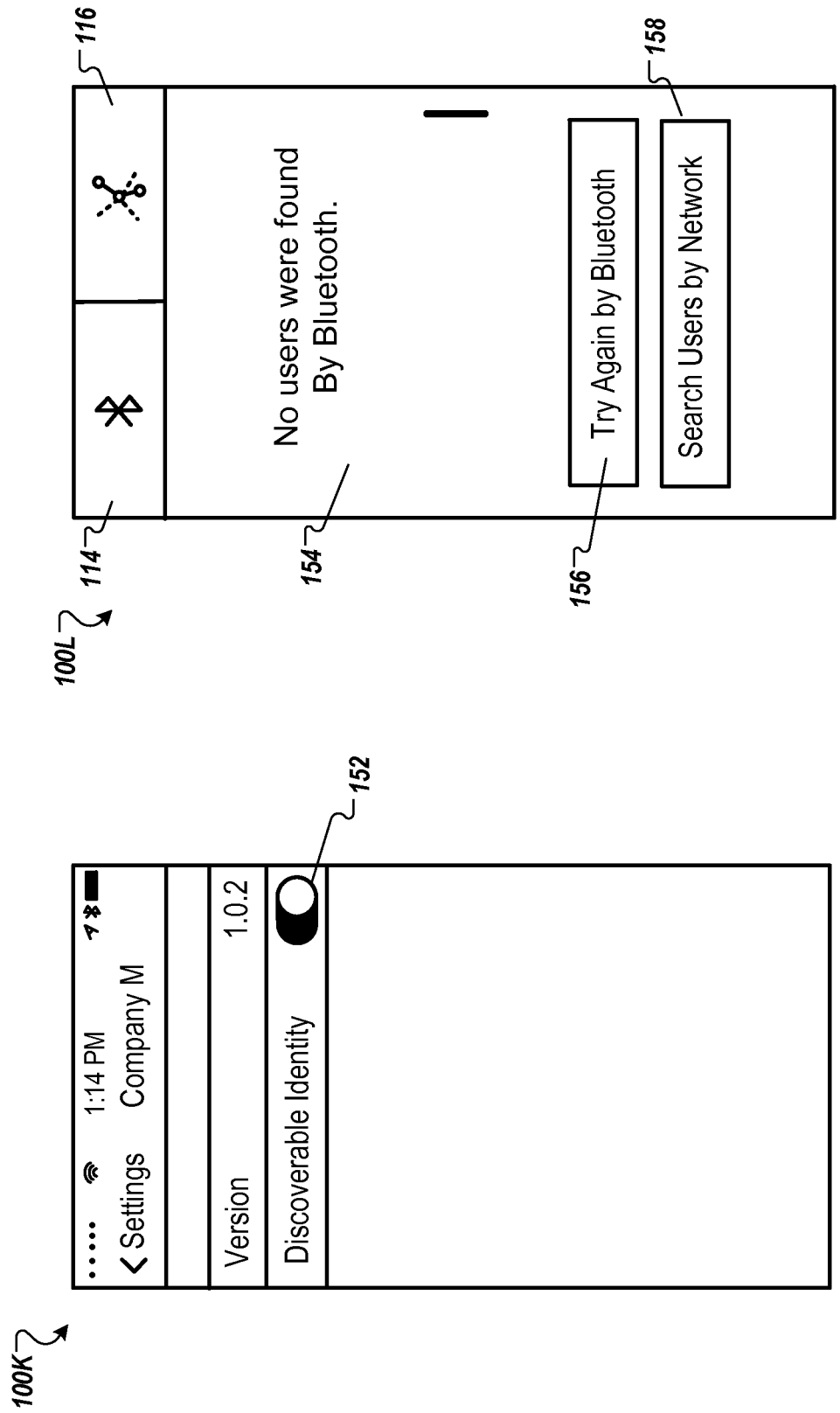

In some instances, representations of electronic credentials for individuals, or for groups of individuals, or both, are generated. The credentials may be, for example, identity credentials (driver's licenses, passports, visas, police badges etc.), health insurance cards, loyalty cards, badges reflecting membership in a group (e.g., employees of a company, students of an educational institution, gym club memberships, etc.), badges to gain entrance to a location or event, a ticket for entry to a location or event, a key that unlocks a lock (e.g., for entry to a location), etc.

Different electronic credentials may be issued by different credential issuing organizations. For example, a company may have an associated credential issuing organization issuing credentials for its employees that are used for accessing various company resources, while a physical fitness chain may have another associated credential issuing organization that issues credentials to its members for accessing the fitness centers managed by the chain.

The credentials issued by different credential issuing organizations may be managed using a credential management system, which enables a first user of the system to validate a credential presented by a second user of the system irrespective of the credential issuing organization that issued the credential. Responsive to successful validation of a credential, information associated with the validated credential (including information about the credentialed second user) may be disseminated to the validating first user.

Credentials can be maintained on and/or accessed from electronic client devices (e.g., mobile computing devices like smart phones, tablet computers, electronic book readers, or laptop computers), which are also referred to as client devices, or simply as devices. Instances of an application associated with the credential management system may run on the client devices for managing credentials stored therein. A server, or collection of servers, also may be associated with the credential management system for centralized management of credentials issued by various credential issuing organizations and for distributing credentials to appropriate users' client devices. Users and third-parties may operate the client devices to present representations of the credentials for validation, and the representations may be validated using suitable mechanisms. For example, in some implementations, the servers associated with the credential management system may be used to validate the credentials.

In some implementations, a user may use the credential management application running on her client device to discover other users (also known as "peers" or "peer users") associated with a common credential issuing organization. For example, an employee of company M may want to determine which other employees are present at a certain location, such as a convention hall. The employee may use the application running on her device to use the device's network connectivity resources to search for other devices in the immediate neighborhood that are storing credentials issued by company M. Any device discovered by this process may send information about its locally-stored credential to the validating user's device. The application on the validating user's device may validate the received credential information using the credential management system and thus determine whether the credential is issued by company M, and thereby confirm whether another company employee, associated with the validated credential, is present at the convention hall.

In some implementations, the application on the validating user's device may control the validating user's device to scan for other devices that are located within a first communication range of the validating user's device. This may be performed, for example, using a communication protocol (e.g., a Bluetooth-based protocol) that enables exchange, with the validating user's device, of direct wireless communications using the communication protocol. Based on the scan, the application may discover a second device that is located within the first communication range of the validating user's device and that is broadcasting, over the communication protocol, an identifier that indicates association with the validation system. The identifier that is broadcast by the second device may, in some implementations, include identification information that corresponds to a user associated with the second device and that uniquely identifies the user of the second device on the validation system.

As an example, if the communication protocol is a Bluetooth-based protocol, then the identifier may include one or more Universally Unique Identifiers (UUIDs), and may be broadcast during a service-advertisement phase by the second device. In this example, the identification information that is included in the advertised identifier may include a combination of UUIDs, selected from among a subset of possible UUIDs. The validating user's device may confirm that the combination of UUIDs corresponds to a valid identification information of a user of the second device. The combination of UUIDs that comprise the identification information may be selected, for example, to After performing the scan, the application executing on the validating user's device may receive the identifier that is broadcast from the second device and may extract the identification information included in the identifier. The application executing on the first device validates the identification information by communicating with a validation server associated with the validation system. Based on validating the identification information, the application executing on the first device displays an indication that the second device associated with the user is located within the first communication range of the first device.

There may be several advantages offered by including identification information in the identifier that is initially broadcast by the second device. In some implementations, this may have the advantage of simplifying and/or expediting the process of pairing two devices, for example, by not necessarily requiring a separate communication phase to exchange and validate identification information (e.g., a single scanning/advertising phase may allow the validating user's device to both find a second device and validate the second device).

In some implementations, the identification information that is included in the identifier may be used in conjunction with additional identification information that is received by the validating user's device from the second device in a separate validation phase. An advantage of this combined approach may be to expand the user base of the communication protocol by sending identification information in both an initial scanning/advertising phase as well as in an additional validation phase, therefore augmenting the total amount of identification information that is available (e.g., increasing the total number of bits devoted to identification information) and thus accommodating an increased number of unique user identities.

The application may have other uses in various contexts. As another example, the employee of company M may want to determine which other employees were present within a certain geographic distance, such as 3 miles of the office premises, in the last two hours. The employee may use the application on her device to control the device's network connectivity resources to send a query to a credential management server for information about the other employees. The server may send back information about company M employees who are determined to have been within 3-mile geographic distance in the last 24 hours. The server may make this determination based on the company M employees using their issued credentials to perform some action that is logged by the server. The application on the user's device may display this information to the employee making the query.

The rest of this disclosure describes in greater detail techniques by which a user, who is associated with a device that runs an application managing the user's credentials issued by a credential management system, may discover other users, who are also associated with devices running the application managing respective credentials issued by the credential management system. In performing the discovery, the application running on the user's device is used, leveraging the networking capabilities of the device.

In the following description, a user who is validating a credential or searching for other users is also referred to as a validating user, while a user associated with the validated credential discovered in the neighborhood of the validating user is also referred to as a validatee or peer user. The client device associated with the validating user is referred to as a validating client device or validating device. The client device associated with a peer user is referred to as a peer device. The credential management system is also referred to as a validation system, while the credential management application is also referred to simply as the application.

FIGS. 1A-1L show screens 100A-100L displayed by a sample user interface running on a client device that is operable to present representations of credentials and enable searching for other devices that are associated with credentials issued by a common credential issuing organization. The user interface (UI) may be shown on a display coupled to a client device corresponding to user. The UI may be associated with an instance of the credential management application that is executed on the client device.

In some implementations, the credential management application may be a set of instructions that are stored in memory coupled to the client device. The memory may be any suitable combination of flash memory, random access memory (RAM), read-only memory (ROM), electrically erasable programmable read-only memory (EEPROM), or hard disk, among others. The instructions may be executed by one or more processors coupled to the client device.

In some other instances, the credential management application may be implemented as programmable logic on an integrated circuit (IC). For example, the application may be programmed in a field-programmable gate array (FPGA) that is included in the client device and executed by the device in conjunction with other hardware coupled to the device.

Although the following sections describe the sample user interface and the credential management application primarily with respect to the validating client device, an instance of the same application may run on any peer device that is registered with a credential issuing organization, and consequently, have one or more locally-stored credentials that are managed by the credential management system. Accordingly, the screens 100A-100L of the application user interface also may be shown on the display coupled to the peer device.

FIG. 1A illustrates a sample credential 100A shown on the user interface along with an optical-machine readable representation for the credential. The credential may be associated with the user of the local client device on which the sample user interface is running. Alternatively, the credential may be associated with another user that is obtained by the application executing on the local client device. In some implementations, the local client device may obtain the other user's credential, for example, the other user's client device, while in some other implementations, the client device may obtain the credential from a remote server, such as a server managed by the credential issuing organization.

The credential 100A includes captions 102 and 106; an image 104; a slider 108; and a representation for the credential 110. The caption 102 provides information identifying the type of the credential and the credential issuing organization. For example, the caption 102 identifies the credential as an "Employee ID" for "Company M Incorporated."

The image 104 is an image of the user associated with the credential. In some implementations, the image 104 allows visual identification of the employee associated with the credential.

The caption 106 provides the name, or other identifying information, or both for the user associated with the credential. For example, as shown, the caption 106 provides the name of the employee associated with the credential 100A as "John Doe" and the employee designation as "Security Team Lead."

The slider 108 may enable a user to select between different representations for the credential 100A by swiping between different positions of the slider. A representation for a credential may be a depiction or rendering corresponding to the credential that enables the credential to be validated. For example, the slider 108 may include four positions indicated by the dots included in the slider 108, as shown in FIG. 1A. In the first position of the slider, the slider 108 may cause an optical-machine readable representation for the credential 110 (e.g., a quick response (QR) code) to be displayed, as shown in FIG. 1A. A validating device can scan the portion of the client device's display showing the credential representation 110 and process the scanned credential representation to validate the credential 100A.

In some implementations, the slider 108 may not be present. This may be the case, for example, when credential 100A includes a single representation, a QR code representation.

In some implementations, there may be multiple credentials associated with the user of the local client device. The different credentials may be stored by the local client device and managed by the credential management application executed on the local client device. These different credentials may be issued by different credential issuing organizations, or by the same credential issuing organization, or by a combination of both. For example, one credential may be a gym membership badge that is issued by a credential issuing organization associated with the user's fitness center. In addition to the "Employee ID" credential 100A, the local client device may store another credential issued by Company M Incorporated, such as a badge that allows access to a conference room at the company's office building. The user can select any one of these credentials using the application to output a representation of the credential on the application user interface.

In some implementations, the display coupled to the client device may be a presence-sensitive display (for example, a capacitive touch-sensitive display). In such implementations, the user may interact with the user interface of the application by touching areas of the display (e.g., using a finger or a stylus) that show various options presented by different pages of the user interface. For example, the user may provide an input on the user interface to search for peers who are associated with devices that are also running instances of the credential management application to manage credentials issued by the same credential issuing organization that has used the user's credentials.

In some implementations, the user may provide input 112 to search for peers by touching the user interface while the credential 100A is displayed, and sliding in one direction (such as horizontally from left to right or right to left, or vertically up or down). Upon receiving the user input, the user interface of the application transitions from displaying the credential 100A to displaying the screen 100B shown by FIG. 1B.

Screen 100B of the user interface may be shown when the application initiates a search for peers upon receiving the input from the user associated with the local client device. Screen 100B includes tabs 114 and 116; and a panel 118. The panel 118 displays a notification 118a and a graphical icon 118b.

In some implementations, each tab 114 or 116 is associated with a different page that is displayed by the screen 100B when the corresponding tab is selected by the user. For example, as shown, the tab 114 has been selected and the panel 118, which is associated with the tab 114, is shown on the display.

In some implementations, each tab 114 or 116 is associated with a different process for discovering peers. The different processes may correspond to different communication protocols that are used in the discovery. For example, tab 114 may be associated with a peer discovery process that utilizes a short-range or direct connectivity communication protocol, such as Bluetooth™, Wi-Fi Direct, or near field communication (NFC), among others. In the example shown, the communication protocol used is Bluetooth™. The short-range communication protocol may be useful in a peer discovery process to find peers who are in close physical proximity to the user of the local client device, such that the devices of the peers may communicate directly with the local client device using the short-range protocol.

In contrast, the tab 116 may be associated with peer discovery process that utilizes a long-range communication protocol or a combination of protocols, such as IEEE 802.11, LTE, WiMAX, other 3G, 4G or 5G protocols, Ethernet, Internet connections, among others. The long-range communication protocol may be useful in a discovery process to find peers who are distributed in a certain geographical region surrounding the local client device, where the geographical region is greater than a range of communication in which the short-range or direct connectivity protocols may be used.

Although screen 100B shows only two tabs 114 and 116, there may be additional tabs present. In some implementations, there may be as many tabs as the number of communication protocols supported for performing the peer discovery. For example, the application may implement each of Bluetooth™, Wi-Fi Direct, IEEE 802.11 and LTE for performing peer discovery searches. In such an implementation, the screen 100B may include four tabs, one for each supported protocol.

In some implementations, when the user interface of the application transitions to displaying the screen 100B upon receiving a user input, the peer discovery process is initiated by default using the short-range protocol. In other implementations, upon transitioning to the screen 100B, the user is provided with an option to select the process to be used for the search.

When the search is performed using the short range protocol associated with the tab 114, the panel 118 provides information on the status of the search as the search progresses. For example, when the discovery is performed using Bluetooth™, the panel 118 may display the notification 118a, which states, "Searching for Nearby Users by Bluetooth." In addition, in some implementations, the panel 118 may display graphical icon 118b along with an animation of radio waves propagating from the graphical icon, as shown by the screen 100B.

While the panel displays the graphical icon 118b along with the animation on the screen 100B, the application controls the network resources of the client device to scan a predetermined first neighborhood around the client device using the short-range communication protocol. In some implementations, the first neighborhood may be determined based on the features of the short-range communication protocol. For example, the first neighborhood may be limited by the maximum geographic distance from the client device up to which signals transmitted by the client device using the short-range communication protocol may be successfully received. In some implementations, the short-range communication protocol used may be a version of Bluetooth™, such as Bluetooth Low Energy (BLE), with the range of the protocol transmission set to 100 meters.

In some other implementations, the first neighborhood may be configured by the credential issuing organization. For example, the administrator of the credential issuing organization may specify the maximum geographic distance covered by the first neighborhood, and this limit may be observed by the credential management system associated with the application.

The application controls the network resources (e.g., network radio) coupled to the validating device to scan the first neighborhood for signals transmitted by peer devices using the short-range communication protocol. The application listens for a unique identifier that is included in the signal transmissions by the peer devices. The unique identifier may be issued by the credential issuing organization. Receiving the unique identifier in a signal from a peer device indicates to the validating device that the peer device is associated with the credential issuing organization.

In some implementations, in addition to the unique identifier associated with the credential issuing organization, the signal received from a peer device includes information corresponding to a credential issued to the user of the peer device by the credential issuing organization. After confirming that the peer device is associated with the credential issuing organization based on the unique identifier included in the signal received from the device, the application extracts the credential information from the signal and validates the peer device based on this credential information. If the peer device is successfully validated as being registered with the credential issuing organization, the application displays identifying information corresponding to the peer user on the user interface shown on the display coupled to the validating device. In this manner, peer users in the first neighborhood of the validating device may be discovered and their information displayed on the user interface of the application shown on the validating device.

In some implementations, the local application sends the credential information received from the peer device to a validation server associated with the credential management system. The local application communicates with the validation server over a wide-area network connection that is established using the connectivity resources provided by the local client device.

If the validation server determines that the peer credential is valid, the server sends back to the local application information indicating that the credential is valid, along with additional identifying information corresponding to the peer user, such as the user's name, occupational title, a graphical image associated with the user (e.g., a photograph), and contact address, among others.

In some implementations, the application validates the received peer credential information locally at the client device, without sending the credential information to the validation server. This may be the case, for example, when the client device does not have a wide-area network connection to communicate with the validation server (for example, the client device is in an "offline" mode), or when there is sufficient additional information available at the client device to validate the credential information without requiring the resources of the validation server, or both. Even if the client device is unable to communicate with the validation server using a wide-area network connection, the short-range communication protocol should be enabled on the client device such that peer discovery of devices in the neighborhood of the client device may proceed.

In some instances, the local application may receive from the peer device, in addition to the peer credential, other information that may aid in validating the received credential locally. For example, the peer device may send to the validating client device identifying information corresponding to the peer user, such as the user's name, occupational title, a graphical image associated with the user (e.g., a photograph), and contact address, among others. The client device may use this identifying information to validate the received credential.

When the local application has information indicating that the received credential is valid, either based on communication with the validation server or local validation, the application transitions the user interface from the screen 100B to the screen 100C that is shown in FIG. 1C, and displays information about the discovered peer user on the user interface.

The screen 100C includes first panel 120 and a second panel 122. The first panel 120 displays a credential representation 124 and a graphical icon 126. The credential representation 124 includes a graphical image 124a and other identifying information 124b. The second panel 122 includes tiles such as 122a, 122b and 122c, and other descriptive information.

The credential representation 124 corresponds to the validated credential of the discovered peer user. The representation includes a graphical image 124a of the peer's credential that is received from the peer device. The identifying information 124b included in the representation 124 may be received from the peer device as part of the credential, or it may be received from the validation server when the credential is validated. As shown, in some implementations, the identifying information may include the name of the user (e.g., "John Doe") associated with the credential representation. The identifying information also may include the occupational title of the user (e.g., "Security Team Lead") that is known to the credential management system.

The graphical icon 126 is a miniature version of the icon and the associated animation shown by the panel 118. The icon 126 may indicate that the peer discovery is still in progress as the process attempts to find additional peers in the neighborhood of the local client device, or that the displayed credential representation 126 has been discovered using the short-range discovery protocol, or both.

In some implementations, the panel 122 may be displayed at the bottom of the screen 100C, as shown. However, in other implementations, the panel 122 may displayed at the top, or on either left or right side, of the screen 100C. As additional peers are discovered using the short-range protocol, the panel 122 is populated with tiles 122a, 122b, or 122c, corresponding to the discovered peers.

In some cases, the tiles may be graphical icons 122a or 122c that act as placeholders for credential representations. For example, the panel 122 may be updated as soon as a peer is discovered, but before the credential corresponding to the peer is validated. In such an event, the thumbnail corresponding to this peer will show the graphical icon (e.g., 122a or 122c) indicating that the discovered peer's credential has not been validated yet. Once the credential is validated and the associated identifying information is available at the application, the graphical icon is replaced by a thumbnail of an image associated with the credential, e.g., 122b.

In addition to the tiles, the panel 122 may provide descriptive information indicating the number of peers discovered, such as "Total Found: 15 people," which indicates that 15 peers have been discovered in the neighborhood of the local client device by the peer discovery process employing the short-range communication protocol. The descriptive information may be rendered as text above or below the displayed tiles.

The user viewing the screen 100C may scroll left or right on the panel 122 to view the tiles corresponding to all the discovered peers. The user may select a tile associated with a credential representation that is not shown on the first panel 120. Based on the user selection, enlarged version of the corresponding credential representation may be displayed on the first panel 120 replacing the credential representation 124. In some implementations, the enlarged version of the credential representation corresponding to the selected tile may be displayed only when the credential has been validated. In such cases, if the user selects the associated tile, a notification may be shown in the first panel 120 indicating that the corresponding credential is not yet validated.

In some implementations, the maximum number of peer users who are found by the peer discovery search using the short-range communication protocol may be limited to a predetermined valued. For example, the maximum number may be set to 30. This number may be configured by the credential issuing organization, or by the credential management system. Once the number of peer users discovered reaches the predetermined number, the application will stop the peer discovery search. In such cases, the validating user will be able to scroll through the tiles on the panel 122 to browse all the predetermined maximum number of discovered users, but no more users will be added to the panel 122. In some implementations, the graphical icon 126 may be grayed out with no animation, indicating that the search process has stopped.

In some implementations, alternatives to the screen 100C may be used. For example, the application may transition the user interface from the screen 100B to the screen 100D that is shown in FIG. 1D, and display information about the discovered peer user on the user interface.

The screen 100D is largely similar to the screen 100C and includes a similar first panel 120 that displays the credential representation 124 and the graphical icon 126. The credential representation 124 includes the graphical image 124a and other identifying information 124b. However, the second panel 123 in the screen 100D is different from the second panel 122. The first position in the panel 123 is occupied by a tile 123a that indicates the number of peers discovered, such as "15 Total," which indicates that 15 peers have been discovered in the neighborhood of the local client device by the peer discovery process employing the short-range communication protocol. The panel 123 may not include other descriptive text above or below the displayed tiles, as is done in the panel 122. Following the tile 123a, the panel 123 includes tiles corresponding to the discovered peers, such as 122b and 122c.

In some instances, the application may implement other alternatives to the screen 100C or the screen 100D. To illustrate, the application may transition the user interface from the screen 100B to one of the example screens 100E, 100G, 100H or 100I that are shown in FIGS. 1E, 1G, 1H and 1I respectively, and display information about the discovered peer user on the user interface. In some implementations, the application may use combinations of the screens 100C, 100D, 100E, 100G, 100H and 100I, such that the user interface transitions from one screen (e.g., 100C) to another screen (e.g., 100E or 100G) based on user input.

As shown in FIG. 1E, the screen 100E includes a first panel 128 and a second panel 130. The first panel 120 displays tiles such as 128a, 128b and 128c. The second panel 130 includes information 130a and a graphical icon 130b.

The tiles may be displayed in the first panel in some suitable arrangement, e.g., a matrix or an array. In some cases, the tiles may be graphical icons, such as 128a or 128b that act as placeholders for credential representations. For example, as described previously, the panel 128 may be updated as soon as a peer is discovered, but before the credential corresponding to the peer is validated. In such an event, the tile corresponding to this peer will show the graphical icon (e.g., 128a or 128b) indicating that the discovered peer's credential has not been validated yet. Once the credential is validated and the associated identifying information is available at the application, the graphical icon is replaced by a thumbnail of an image associated with the credential, e.g., as shown by the tile 128c. As additional peers are discovered using the short-range protocol, the panel 128 may be dynamically updated with new tiles corresponding to the discovered peers, which may be placed in the empty areas of the panel 128.

In some implementations, the panel 130 may be displayed at the top of the screen 100E, as shown. However, in other implementations, the panel 130 may displayed at the bottom, or on either left or right side, of the screen 100E.

In some implementations, the information 130a included in the panel 130 may indicate the number of peers discovered. For example, as shown, the information 130a may be descriptive text, such as "Total 15 people found," which indicates that 15 peers have been discovered in the neighborhood of the local client device by the peer discovery process employing the short-range communication protocol.

In some implementations, the user viewing the screen 100E may select an input option represented by the graphical icon 130b to refresh the tiles shown on the panel 128. This may be the case, for example, when the panel 128 is not dynamically updated even though the peer discovery search is ongoing in the background. In such cases, when the user makes such an input, e.g., by touching the icon 130b, the application updates the panel 128 with new tiles corresponding to additional peers discovered since the last refresh of the panel 128. The new tiles may be placed in the empty areas of the panel 128. In addition, the application may update the information 130a to indicate the updated number of peers discovered.

The user may select a tile shown on the panel 128. In some implementations, if the user selects a tile corresponding to a credential that has not been validated yet, such as 128a or 128b, a notification may be displayed indicating that the corresponding credential is not yet validated. On the other hand, if the user selects a tile corresponding to a credential that has been validated, such as 128c, an enlarged representation of the corresponding credential may be displayed on the user interface, as shown by the screen 100F in FIG. 1F.

The application may display the screen 100F as an overlay on the screen 100E such that portions of the screen 100E are visible in the background in a partially translucent form. The screen 100F displays the credential representation 125, which corresponds to the validated credential that is associated with the tile 128c selected by the user. The screen 100F also includes a graphical icon 132.

The credential representation 125 includes the graphical image 125a and other identifying information 125b. The graphical image 125a is similar to the graphical image 124a, while the identifying information 125b is similar to the identifying information 124b. The graphical icon 132 may represent a user option for closing the enlarged credential representation 125 and reverting to the screen 100E. Accordingly, upon receiving user input selecting the graphical icon 132, the application may close the enlarged credential representation 125 shown by the screen 100F, and change the user interface back to the screen 100E, once again displaying the panel 128 including the tiles 128a, 128b and 128c, and the panel 130 including the information 130a and the icon 130b.

FIG. 1G illustrates the sample screen 100G that may be displayed by the application on the user interface as an alternative to the screens 100C, 100D or 100E. The screen 100G includes a first panel 134 and a second panel 136. The first panel 134 displays tile 134a, 134b and 134c on credentials of discovered peers. The second panel 136 includes information 136a and a graphical icon 136b.

The first panel may display the tiles 134a, 134b and 134c in some suitable arrangement, e.g., as rows in a stack. There may be a single tile in each row that is associated with a different credential. Each tile 134a, 134b or 134c may include a graphical icon or an image thumbnail of the corresponding credential and other information identifying the peer associated with the credential. The graphical icon or image thumbnail and the identifying information in each tile may be horizontally adjacent to each other. As described previously, the graphical icons, such as in tiles 134a or 134b, may act as placeholders for credential representations when the received credentials have not yet been validated, or the image associated with the credential is not yet available, or both. However, the other identifying information that is known to the application may be displayed even when the credentials are not validated. For example, tile 134a shows the graphical icon indicating that the credential is not yet validated, but provides the name ("Jerry Sanders") and the title ("Security Team") of the associated peer.

Once the credential is validated and the associated identifying information is available at the application, the corresponding tile includes a thumbnail of the image associated with the credential. For example, 134c shows the thumbnail of the image associated with the corresponding credential, indicating that the credential has been validated. In addition, 134c presents the name ("John Doe") and the title ("Security Team Lead") associated with the validated credential.

As additional peers are discovered using the short-range protocol, the panel 134 may be dynamically updated with new tiles corresponding to the discovered peers. In some implementations, the new tiles are added at the top of the panel 134 such that the tile 134a, 134b and 134c are pushed down the displayed stack. In other implementations, the new tiles are added to the bottom of the panel 134 such that the tile 134a, 134b and 134c maintain their positions on the display.

The panel 136 is similar to the panel 130 described previously. The panel 136 may be displayed at the top of the screen 100G, as shown. However, in other implementations, the panel 136 may displayed at the bottom, or on either left or right side, of the screen 100G. The information 136a included in the panel 136 is similar to the information 130a described previously, while the graphical icon 136b is associated with a similar function as the graphical icon 130b.

The user may select a tile shown on the panel 134. In some implementations, if the user selects a tile corresponding to a credential that has not been validated yet, such as 134a or 134b, a notification may be displayed indicating that the corresponding credential is not yet validated. On the other hand, if the user selects a tile corresponding to a credential that has been validated, such as 134c, an enlarged representation of the corresponding credential may be displayed on the user interface, for example as shown by the screen 100F and described in the preceding sections.

FIG. 1H illustrates the sample screen 100H that may be displayed by the application on the user interface as an alternative to the screens 100C, 100D, 100E or 100G. The screen 100H includes a first panel 138 and a second panel 140. The first panel 138 displays tiles 138a and 138b corresponding to credentials of discovered peers. The second panel 140 includes information 140a.

The first panel may display the tiles 138a and 138b in some suitable arrangement, e.g., as rows in a stack, with each row including one tile. Each tile includes either a graphical icon or an image thumbnail of the corresponding credential, and other identifying information for the peer associated with the credential. The graphical icon or the image thumbnail and the identifying information may be vertically adjacent to each other in each tile, as shown in 138a or 138b. The dimensions of each tile may be such that the width of the tile approaches the width of the display area of the panel 138. The width of the graphical icon or the image thumbnail may be same as the width of a tile. Accordingly, the dimensions of a graphical icon or image thumbnail may be such that its width approaches the width of the display area of the panel 138.

As in the alternative screens, the graphical icons, such as in 138a or 138b, act as placeholders for credential representations when the received credentials have not yet been validated, or the image associated with the credential is not yet available, or both. However, the other identifying information that is known to the application may be displayed even when the credentials are not validated. For example, the tile 138a shows the graphical icon indicating that the credential is not yet validated, along with the providing the name ("Jerry Sanders") and the title ("Security Team") of the associated peer.

Once the credential is validated and the associated identifying information is available at the application, the corresponding tile displays a thumbnail of the image associated with the credential. In some implementations, once a credential is validated, the corresponding tile displays an enlarged representation of the validated credential, for example similar to the representation 125, with the graphical image 125a covering the width of the associated tile.

In some implementations, the dimensions of the tiles 138a or 138b may be such that only one complete tile may be presented on the user interface in the viewable area of the display coupled to the client device. A portion of one or more other tiles also may be presented in addition. For example, the tile 138a may be shown in its entirety, while a portion of the tile 138b may be viewable.

The user viewing the screen 100H may scroll up or down on the panel 138 to view tiles corresponding to other discovered peers. For example, the user may provide input 142 on the device display. In response to receiving the input 142, the user interface is scrolled in the direction of movement of the input. As the user interface is scrolled, the currently displayed tiles move out of the viewable area while tiles that were not previously viewable come into view. For example, if the user interface is scrolled upward, the tile 138a may move out of the viewable area while the tile 138b may be shown in its entirety, with other tiles that are vertically below tile 138b sequentially coming into view.

In some implementations, as additional peers are discovered using the short-range protocol, the panel 138 may be dynamically updated with tiles corresponding to the newly discovered peers being added. In other implementations, the panel 138 is updated in response to the input 142. In such implementations, the input 142 serves the dual purpose of scrolling the user interface and also refreshing the tiles displayed on the user interface.

In some implementations, the new tiles are added at the top of the panel 138 such that the tiles 138a and 138b are pushed down the displayed stack. In other implementations, the new tiles are added to the bottom of the panel 138 such that the tiles 138a and 138b maintain their positions in relation to the top of the stack.

The panel 140 may be displayed at the top of the screen 100H, as shown. However, in other implementations, the panel 140 may displayed at the bottom, or on either left or right side, of the screen 100H. The information 140a included in the panel 140 is similar to the information 136a described previously.

In some implementations, the user may select one of the tiles shown on the panel 138. If the user selects a tile corresponding to a credential that has not been validated yet, such as 138a or 138b, a notification may be displayed indicating that the corresponding credential is not yet validated. On the other hand, if the user selects a tile corresponding to a credential that has been validated an enlarged representation of the corresponding credential may be displayed on the user interface, for example as shown by the screen 100F and described in the preceding sections.

In some implementations, as peers are discovered using the short-range communication protocol, the application may send information about the discovered peers to a heads-up display (HUD) associated with the validating user. The information may include the identity of the discovered peers, or information about their credentials, or both. The application may send the information to the HUD over a network that is established using a short-range communication protocol using the network resources of the client device. The HUD may project the information received from the application on a screen for viewing by the validating user.

For example, the application may send information about the discovered peers to a Google Glass™ device used by the validating user. The information may be sent over a Bluetooth™ connection established between the validating device and the Google Glass™ device. Upon receiving the information from the application, the Google Glass™ device may project the identities of the discovered peers, or their credential information, on the device lens, overlaid on the view of the room as seen through the lens. In some implementations, the projected information about the discovered peers may be similar to the tile 122b shown by the screens 100C or 100D.

In some implementations, when the application searches for nearby peers based on the user input (e.g., 112), the application may determine that there are no nearby users. This may be the case, for example, when the application, upon controlling the network resources of the client device to scan the predetermined neighborhood using the short-range communication protocol, does not receive a response signal from any peer device that includes information indicating that the peer device is running an instance of the application associated with the credential management system. The short-range communication protocol may be operable to cease scanning after a predetermined time period. In some implementations, this time period may be a feature of the protocol, while in other implementations, this time period may be configurable, e.g., by the user of the client device or by the administrator of the credential issuing organization. If no peer devices are discovered in the scanning time period, the application may determine that there are no users within the predetermined neighborhood of the client device and accordingly, the application transitions the user interface from the screen 100B to the screen 100I as shown in FIG. 1I.

The screen 100I includes a first panel 144 and a second panel 146. The panel 144 displays a notification informing the user that no peer has been discovered in the predetermined neighborhood of the client device. For example, as shown, the panel 144 may display the notification text "No nearby users found," along with a graphical notification icon 144a adjacent to the text.

The second panel 146 includes instruction 146a and a button 146b. The instruction 146 informs the user to take certain steps to facilitate the discovery process. For example, it may be the case that no peers are discovered because the peer devices, if any are present in the vicinity of the client device, are outside the distance in which the short range communication protocol can scan. This distance may be based on the range of the predetermined neighborhood of the client device. Accordingly, the application may instruct the user to move the client device closer to other peer devices such that the peer devices are within the neighborhood of the client device. For example, the instruction 146a may ask the user to "Bring the device close to another." This may be useful, for example, in situations where the user knows that there are peers close by, but the distance between the client device and the peer device is greater that the distance of scanning of the short range communication protocol.

The button 146b provides an option to the user to reinitiate the peer discovery process. For example, the user may move the validating client device closer to peer devices that are nearby, and then provide an input selecting the button 146b. In response to the user input, the application may control the network resources of the client device to perform a new search for peer devices using the short-range communication protocol. In some implementations, as the new search is started, the application may transition the user interface from the screen 100I back to the screen 100B.

In some implementations, upon receiving the user input 112 to start a peer discovery search, the application may determine that the network resources on the client device associated with the short-range communication protocol are disabled. This may be the case, for example, when the short-range communication protocol radio (e.g., Bluetooth™ radio) coupled to the client device is turned off. In such cases, the application may transition the user interface from the screen 100B to the screen 100J shown in FIG. 1J.

The screen 100J includes a first panel 150 and a second panel 148. The panel 148 presents descriptive text indicating that the displayed screen 100J is associated with the peer discovery process. For example, as shown, the panel 148 may present the text "Search for nearby users."

The panel 150 includes instruction 150a and buttons 150b and 150c. The instruction 150a informs the user to take certain steps to enable the short-range communication protocol on the client device to start the peer discovery process. For example, the short-range communication protocol may be Bluetooth™. In this case, as shown, 150a may state "Please make sure Bluetooth is On. Go to Settings>General>Bluetooth," which instructs the user to access the "Settings" for the client device and navigate to the "General" settings under which Bluetooth may be enabled.

The button 150b provides an option to the user to launch the Settings menu for the client device. If the user provides an input selecting the button 150b, a user interface for the device Settings menu will be shown on the device display, allowing the user to navigate to the settings for the short-range communication protocol and enable the protocol.

The button 150c provides an option to the user to cancel the process. In some implementations, if the user provides an input selecting the button 150c, the application terminates the search for peer devices and reverts back to the screen 100A. If the user wants to start a new search for peer devices and the short-range communication protocol is still disabled, then the application will again transition to the screen 100J to instruct the user to enable the protocol.

A peer device may be discovered during a peer discovery search if the client device is operable to broadcast its identity to nearby devices using the short-range communication protocol. For example, a peer device may periodically transmit a signal in its first neighborhood that includes a unique identifier associated with the credential issuing organization with which the device is registered.

In some implementations, the signal that is broadcast by the peer device during the peer discovery search may also include identification information that is unique to the peer device or the user of the peer device. As an example, the identification information may be unique across organizations. In such implementations, the application may utilize the received broadcast signal from the peer device to not only discover the peer device, but also to receive identification information for the peer device and validate the peer device, without necessarily being required to use a separate validation phase. This may have the advantage of expediting the validation process by enabling the initial peer discovery phase to function as both a discovery and a validation phase.

In some implementations, the identification information that is obtained during the peer discovery phase may be used in addition (not as an alternative) to identification information that is transmitted during an additional validation phase. In such cases, the combination of identification information transmitted during the initial peer discovery phase and the identification information transmitted during a subsequent validation phase may be used to increase the number of unique user identities that are accommodated by the communication protocol.

In some implementations, the credential management application running on the peer device may provide an option to the peer user to opt out of the peer discovery process so that the peer is not found during a peer discovery search by another user. The peer user may opt out by configuring the discovery settings for the credential management application using the user interface screen 100K shown in FIG. 1K. In some implementations, the screen 100K may be accessed from the main Settings menu of the peer device, which is controlled by the underlying operating system of the device. In other implementations, the screen 100K may be accessed from the credential management application itself.

The screen 100K includes a setting "Discoverable Identity" associated with finding the peer device during a discovery search. In some implementations, this setting may be enabled by default such that the user's identity will be discoverable by others. However, in other implementations, this setting may be disabled by default and the user will have to enable the setting so that the user's identity becomes discoverable.

In cases where the setting is enabled, the user may disable the setting using the toggle switch 152. Once the user disables the setting by toggling the switch 152, the client device will not include the unique identifier when it periodically transmits the short-range communication protocol signal in its neighborhood. Accordingly, other devices that receive the signal will not be able to determine that the client device is associated with the credential issuing organization due to the absence of the unique identifier in the signal.

Even if the "Discoverable Identity" setting is disabled on the client device, the application running on the client device may still be able to search for other peer devices in its neighborhood (that have their "Discoverable Identity" setting enabled) using the short-range communication protocol.

In some implementations, a client device may be registered with multiple credential issuing organizations. In such implementations, there may be multiple unique identifiers stored at the client device, there being one or more identifiers corresponding to each credential issuing organization with which the client device is registered. For example, a user may register her client device with a credential issuing organization administered by her employer. The employer's credential issuing organization may assign one or more unique identifiers. The user also may register her client device with a credential issuing organization administered by her fitness club, and consequently have one or more unique identifiers assigned by the fitness club's credential issuing organization. The device also may store one or more credentials associated with the different credential issuing organizations with which the user is registered. The different credentials may be managed by the same instance of the credential management application running on the client device.

In such cases, the client device may include one or more of the unique identifiers corresponding to the different credential issuing organizations when it transmits the periodic signal in its neighborhood using the short-range communication protocol. The user may have to separately disable the "Discoverable Identity" setting for each identifier, or for each registered credential issuing organization, or both. In such cases, the screen 100K may provide multiple toggle switches, one for each identifier, or for each registered credential issuing organization, or both.

In some implementations, the user may disable the "Discoverable Identity" setting for some of the identifiers, but not all. In such cases, the client device will not be discoverable by other devices that are associated with the credential issuing organization(s) for which the "Discoverable Identity" setting is disabled. However, the client device will be discoverable by devices that are associated with the other credential issuing organization(s) for which the "Discoverable Identity" setting is enabled.

Even if a peer user disables her identity from being discoverable, the credentials stored on the peer device may still be used for physical access using resources managed by the credential management system (e.g., a door reader entity that manages access to a restricted area). In some implementations, this may be achieved by configuring the application running on the peer device to support multiple identifiers that may be used for different purposes. The multiple identifiers may be associated with the same credential issuing organization. For example, one identifier may be used exclusively for performing physical access, while another identifier issued by the same credential issuing organization may be used for performing validation, and this identifier may be transmitted as part of the signal transmission using the short-range communication protocol. Accordingly, the peer user may disable the second identifier to turn off making their identity discoverable. However, the peer user may still be able to perform the physical access using the first identifier, which is still enabled (but not discoverable by other users).

In some implementations, upon performing the peer discovery search based on the user input 112, no nearby users may be found. As described previously, this may be the case, for example, when no peer devices are discovered using the short-range communication protocol by the time the scanning time period expires. In such cases, the application may determine that there are no users within the predetermined neighborhood of the client device and transition the user interface from the screen 100B to the screen 100L as shown in FIG. 1L.

The screen 100L includes a notification 154 and buttons 156 and 158, apart from the tabs 114 and 116. The notification 154 informs the user that no peer has been discovered in the predetermined neighborhood of the client device by the peer discovery search using the short-range communication protocol. For example, the short-range communication protocol may be Bluetooth™ and, as shown, the notification may read that "No users were found by Bluetooth."

The button 156 provides an option to the user to perform a new peer discovery search using the short-range communication protocol. If the user provides an input selecting the button 156, the application may control the network resources of the client device to perform a new search for peer devices using the short-range communication protocol. In some implementations, as the new search is started, the application may transition the user interface from the screen 100L back to the screen 100B.

The button 158 provides an option to the user to perform a new peer discovery search using the long-range communication protocol. If the user provides an input selecting the button 158, the application may control the network resources of the client device to initiate a search for nearby peer devices using the long-range communication protocol. In some implementations, as the new search is started, the application may switch the user interface from the screen 100L to other screens that are associated with the long-range communication protocol.

FIGS. 2A-2G show screens 200A-200G displayed by a sample user interface running on a client device that is operable to present representations of credentials and enable searching for other devices associated with credentials issued by a common credential issuing organization. The user interface (UI) may be shown on a display coupled to a client device corresponding to user. The UI may be associated with an instance of the credential management application that is executed on the client device.

In some implementations, the client device may be same as the client device and the credential management application may be same as the credential management application described with respect to the screens 100A-100L. In such implementations, the screens 200A-200G may be part of the same user interface as the screens 100A-100L. Accordingly, the following sections describe the screens 200A-200G with reference to the same client device as the screens 100A-100L. However, in other implementations, the client device, or the credential management application, or both, may be different from those discussed with respect to the screens 100A-100L, such that the screens 200A-200G are associated with a different user interface.

Although the following sections described the sample user interface and the credential management application primarily with respect to the validating client device, an instance of the same application may run on any peer device that is registered with a credential issuing organization, and consequently, have one or more locally-stored credentials that are managed by the credential management system.

Accordingly, the screens 200A-200G of the application user interface also may be shown on the display coupled to the peer device.

In some implementations, upon receiving the user input selecting the button 158 on the screen 100L, the application running on the client device transitions the user interface from displaying the screen 100L to displaying the screen 200A shown by FIG. 2A. However, in other implementations, the screen 200A is displayed when the user selects the tab 116 from the screen 100B or the screen 100L.

The screen 200A includes tabs a panel 202 and tabs 204 and 206. The panel 202 displays a notification 202a and a graphical icon 202b.

The tab 204 may be similar to the tab 114, while the tab 206 may be similar to the tab 116. In some implementations, when the application switches to displaying the screen 200A upon receiving a user input, either selecting the button 158 or the tab 116, the peer discovery process using the long-range communication protocol is automatically started. In other implementations, upon transitioning to the screen 200A, the user is provided with an option to select the process to be used for the search. When the screen 200A is shown corresponding the long-range communication protocol search, the tab 206 may be highlighted in some form (e.g., darkened in color in comparison to the tab 204), indicating that the current search is being performed using the communication protocol associated with the tab 206.

In some implementations, the search using the long-range communication protocol is performed in a new neighborhood of the client device that may be different than the first neighborhood associated with the short-range communication protocol. The new neighborhood, also referred to as the "second neighborhood," may cover a greater area compared to the first neighborhood. For example, the second neighborhood may cover an area centered on the client device that has a radius of 3 miles. In contrast, the first neighborhood may cover an area centered on the client device that has a radius of 100 meters. This may be the case because the long-range communication protocol may be operable to transmit and receive signals over a greater geographic distance compared to the short-range communication protocol. However, in other implementations, the second neighborhood may cover the same, or lesser, area compared to the first neighborhood.

The application may identify the second neighborhood to the user as "Network." As the search progresses, the application provides information on the status of the search using the panel 202. For example, the panel 202 may display the notification 202a, which states, "Searching Nearby Users by Network." In addition, in some implementations, the panel 202 also may display a graphical icon 202b. A flashing animation may be associated with the graphical icon, which provides visual indication that a peer discovery search is in progress using the long-range communication protocol.

When the application searches for nearby peers using the long range communication protocol, the application sends a message to a remote validation server associated with the credential management system. The message is sent over a network connection that is established using the network resources associated with the client device. The message includes a request to the server to send information on all nearby users associated with the credential issuing organization. The message also includes information about the present location of the client device. The location of the client device may be determined by using location services that are available on the client device, e.g., Global Positioning System (GPS).

In some implementations, the remote validation server may determine that there are no nearby users. In such implementations, the server may send back a response to the client device with the information that no nearby users are found. Alternatively, the server may not send a response to the client device and the application will time out waiting for a response to the request message. In such cases, the application may determine that there are no nearby users of the client device that can be found in the second neighborhood using the long-range communication protocol, and accordingly transition the user interface from the screen 200A to the screen 200B as shown in FIG. 2B.

The screen 200B includes the same panel 202 and the tabs 204 and 206 as the screen 200A. However, the panel 202 includes a new notification 202c and a button 202d.

The notification 202c informs the user that no peer has been discovered in the second neighborhood of the client device. For example, as shown, the notification 202c may state, "No users were found by Network."

The button 202d provides an option to the user to reinitiate the peer discovery process using the long-range communication protocol. The user may provide an input selecting the button 202d. In response to the user input, the application may control the network resources of the client device to perform a new search for peer devices using the long-range communication protocol. In some implementations, as the new search is started, the application may revert the user interface to the screen 200A.

In some implementations, upon receiving the request from the client device, the remote validation server may identify one or more users in the second neighborhood of the client device. When a user, who has a credential that is managed by the credential management system associated with the server, performs some form of physical access using a credential stored on her device, the information about the device location is transmitted to the server. For example, when the user swipes a key, or scans a QR code, or uses a Bluetooth door reader signal to gain physical access to her office building, the device's location (e.g., using GPS coordinates or wireless triangulation) is logged by the building's credential system and transmitted to the server.

The server may maintain, in local storage coupled to the server, information about user location data that is received based on the physical access calls of the registered user devices. In some implementations, the server may maintain a table that stores all user location data for a predetermined time period, e.g., the past 24 hours, which are collected from the physical access calls.

The location data may be collected as <latitude, longitude>. If the location data corresponding collected from a call is <0,0> for a registered device, this means that the associated user has denied access to the location data and therefore the server will ignore such data.

In some implementations, the server will return, to the validating client device, information about registered users who have a recorded location within the predetermined time period from the time when the validating client device makes the request to the server. The information associated with each user that is returned to the validating device may include one or more of: an image associated with the credential representation, name of the user, the user's title, time and date of the last recorded location, and distance from validating client.

The results may be returned by the server sorted by distance based on the validating client's current distance, returning closest users first. In some implementations, the number of returned results may be limited to a fixed number. For example, the server may return information about a maximum of 100 users.

In some implementations, the validation server may provide an application programming interface (API) that the validating device may use to read the location data stored at the server (e.g., from the table maintained by the server) and get a list of nearby users. The API may return information about the users with location data within the predetermined time period and sorted by distance from the validating device making the request.

In some implementations, if location service is disabled on the validating client device that is being used to search for users, a popup message may be displayed on the searching screen 200A to enable location services. The popup message may be displayed by the underlying operating system. When location service is disabled, the application may disable the graphical icon 202b and the associated animation on the searching screen 200A and the notification 202a may read "Turn on Location Services to search for Nearby Users."

When the information is returned at the validating client device in response to the request message to the validation server, the application processes the received information and displays it on the user interface of the client device, transitioning the user interface from the screen 200A to the screen 200C shown in FIG. 2C. The screen 200C includes the tabs 204 and 206, and a panel 208. The panel 208 includes a map 210, one or more image thumbnails, such as 212a and 212b, and graphical icons such as 214a and 214b.

The map 210 may be displayed as a background for the panel 208. The geographic area covered by the map may correspond to the second neighborhood of the validating client device. The graphical icon 214a displayed on the map may indicate the current location of the validating client device. One or more image thumbnails, such as 212a and 212b, are displayed as overlays on the map. The image thumbnails correspond to the registered users whose inform are returned by the validation server in response to the request message. The images in the thumbnails may be miniature versions of the images associated with the corresponding credential representation. The position of the thumbnails on the map may correspond to the locations of the associated users that are returned in the information received from the validation server.

In some implementations, there may be multiple users at the same location. This may be the case, for example, when several employees have been the office building in the previous day such that their locations at the office have been logged by the building's entry management system and transmitted to the validation server.

In such cases, the application may show on the map the image thumbnail corresponding to one user from the group of multiple users at the same location. In addition, the application may display a graphical icon proximate to the image thumbnail indicating the total number of users who have the same recorded location.

In some implementations, users may be grouped together when their locations are within a certain distance of one another, even if the locations are not exactly the same. The distance may be a part of the application settings and determined to allow a visually pleasing display on the screen 200C, without cluttering the screen with too many thumbnails. For example, if the recorded locations of users are within 200 meters of one another, then the application may group the users together in one unit, and represent the unit on the map by the image thumbnail associated with one of the users in the unit. In addition, the application may display a graphical icon proximate to the image thumbnail indicating the total number of users who have the same recorded location.

For example, the graphical icon 214b is displayed overlaid on the image thumbnail 212b. As shown, the icon 214b displays the number 52. This indicates that a total of 52 users have locations that are either the same as, or within a certain distance of, the location of the user associated with the thumbnail 212b.

In some implementations, the maximum number of thumbnails that are shown on the screen 200C may be limited to a fixed number. For example, the application may display at most 10 thumbnails on the screen at any time. Some of the thumbnails may represent groups of users who share locations with the user associated with the displayed image thumbnail. In such cases, the number of users sharing the location may be indicated by the graphical icon shown proximate to the thumbnail providing a numerical indication of the number of users at the location. The number of displayed thumbnails may be limited so that the map is not cluttered with thumbnails that cover the map area.

In some implementations, the user may provide an input tapping anywhere on the map 210 (but not on the image thumbnails). In response to the user input, the application may hide from view the tabs 204 and 206 such that the entire viewable area of the user interface is occupied by the map 210, as shown by the screen 200D in FIG. 2D. A larger geographic area may be shown by the map 210 on the screen 200D. In some implementations, additional image thumbnails, e.g., 212c, may be visible on the map 210 when the tabs 204 and 206 are hidden.

The user may provide another input tapping anywhere on the map 210 (but not on the image thumbnails) shown by the screen 200D. In response to the user input, the application may bring the tabs 204 and 206 into view, reverting the user interface to the screen 200C.

In some implementations, the validation server may return additional results as the application displays the screen 200C or 200D. For example, the client device may make a server call periodically, e.g., every 20 seconds, as a background process to refresh the list of returned users. As additional results are returned, the map 210 on the screen 200C or 200D will be populated with image thumbnails, or the number indicated by the graphical icon 214b will be incremented, corresponding to the newly returned results.

The user may provide an input selecting an image thumbnail corresponding to a single user (i.e., when the image thumbnail does not represent a group of users at a location). For example, the user may touch the device display at a position proximate to the thumbnail 212a, indicating selection of the thumbnail 212a. In response to the user input, the application displays an enlarged representation of the credential associated with the thumbnail, transitioning the user interface to the screen 200E as shown in FIG. 2E.

The application may display the screen 200E as an overlay on the screen 200C or 200D such that portions of the screen 200C or 200D (e.g., the map 210) are visible in the background in a partially translucent form. The screen 200E displays the credential representation 216, which corresponds to the validated credential that is associated with the thumbnail 212a selected by the user. The screen 200E also includes a graphical icon 218, in addition to the tabs 204 and 206.

The credential representation 216 includes the graphical image 216a, identifying information 216b, temporal information 216c, and a numerical indication 216d. The graphical image 216a is similar to the graphical image 124a, while the identifying information 216b is similar to the identifying information 124b.

The temporal information 216c provides the information regarding the last time the location of the associated user was logged by the validation server. In some implementations, this time may be associated with the last time the user performed a physical access using a resource associated with the corresponding credential management system.

The numerical indication 216d indicates the distance of the user associated with the credential from the validating client device. The distance may correspond to the location where the associated user performed her last physical access that was logged by the credential management system.

For example, as shown, the screen 200E informs that the selected credential is associated with "Jane Smith" (216a) whose title is "User Experience Designer" (216b). She had last "checked in," i.e., performed a physical access that was logged by the credential management system and stored by the validation server, at "11:34 AM Nov. 26, 2013" (216c). The location of her last check in is 2.1 miles (216d) from the present location of the validating device (where the present location of the validating device is indicated on the map 210 by the icon 214a).

The graphical icon 218 may represent a user option for closing the enlarged credential representation 216 and reverting to the screen 200C or 200D. Accordingly, upon receiving user input selecting the graphical icon 218, the application may close the enlarged credential representation 216 shown by the screen 200E, and change the user interface back to the screen 200C or 200D, once again displaying the panel 208 including the map 210, image thumbnails such as 212a and 212b, and the icons 214a and 214b.

The user may provide an input selecting an image thumbnail that represents a group of users at a location. For example, the user may touch the device display at a position proximate to the thumbnail 212b, indicating selection of the thumbnail 212b. In response to the user input, the application displays an enlarged representation of the credential associated with the thumbnail, transitioning the user interface from the screen 200C or 200D to the screen 200F as shown in FIG. 2F.

The application may display the screen 200F as an overlay on the screen 200C or 200D such that portions of the screen 200C or 200D (e.g., the map 210) are visible in the background in a partially translucent form. The screen 200F includes the tabs 204 and 206, a first panel 220 and a second panel 222. The panel 220 displays the credential representation 224, which corresponds to the validated credential that is associated with the thumbnail 214a selected by the user. The panel 220 also includes the graphical icon 218. The panel 222 includes tiles such as 222a and 222b.

The credential representation 224 includes the graphical image 224a, identifying information 224b, temporal information 224c, and a numerical indication 224d. The graphical image 224a is similar to the graphical image 216a. The graphical image 214a corresponds to the user associated with the credential that is received from the validation server.

The identifying information 224b serves the same function as the identifying information 216b; the temporal information 224c provides similar type of information as the temporal information 216c; and the numerical indication 224d similar type of information as the numerical indication 216d.

In some implementations, the panel 222 may be displayed at the bottom of the screen 200F, as shown. However, in other implementations, the panel 222 may displayed at the top, or on either left or right side, of the screen 200F. As additional results are received by the application from the validation server, the panel 222 is populated with additional tiles corresponding to the newly received information.

In some cases, the tiles may be graphical icons that act as placeholders for credential representations. For example, the panel 222 may be updated as soon as a result is returned, but before the application has fully processed the associated image that is received from the validation server. In such an event, the corresponding tile will show the graphical icon (e.g., 222b) indicating that the associated credential is not fully processed yet, or the information corresponding to the associated credential has not been received from the validation server. Once the image is available at the application, the graphical icon is replaced by a thumbnail of the image, e.g., as in 222a.

In addition to the tiles, the panel 222 may provide descriptive information indicating the number of peers discovered, such as "Total People Found: 52," which indicates that 52 peers have been discovered in the second neighborhood of the local client device by the peer discovery process employing the long-range communication protocol. The descriptive information may be rendered as text above or below the displayed tiles.

The user viewing the screen 200F may scroll left or right on the panel 222 to view the tiles corresponding to all the discovered peers. The user may select a tile associated with a credential representation that is not shown on the first panel 220. Based on the user selection, enlarged version of the corresponding credential representation may be displayed on the first panel 220 replacing the credential representation 224. In some implementations, the enlarged version of the credential representation corresponding to the selected tile may be displayed only when the credential has been validated. In such cases, if the user selects the associated tile, a notification may be shown in the first panel 220 indicating that the corresponding credential is not yet validated.

The graphical icon 218 provides the option to close the panels 220 and 222, and return to the screen 200C or 200D. Accordingly, upon receiving user input selecting the graphical icon 218, the application may close the enlarged credential representation 224 and the tiles 222a and 222b shown by the screen 200F, and change the user interface back to the screen 200C or 200D, once again displaying the panel 208 including the map 210, image thumbnails such as 212a and 212b, and the icons 214a and 214b.

Figure 2G:
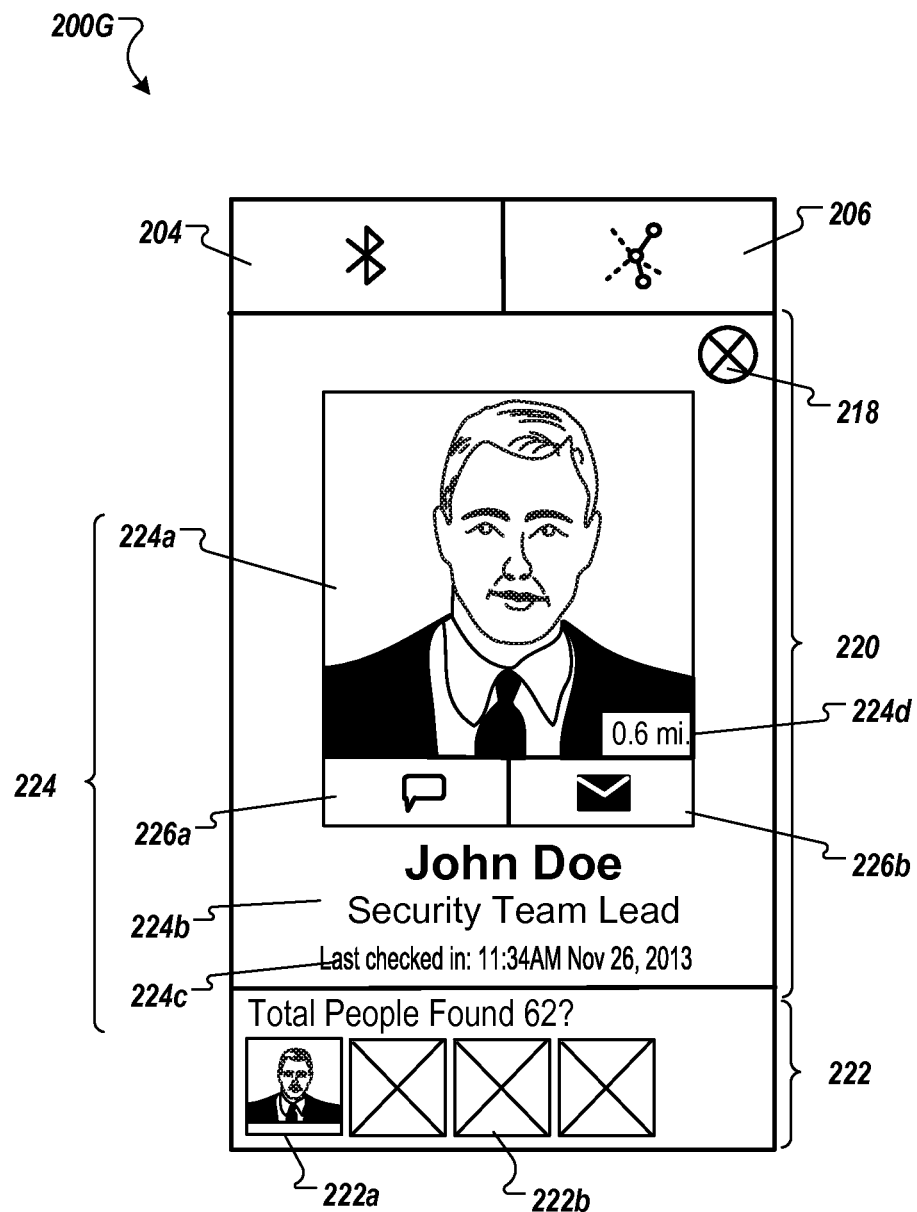

In some implementations, the application may display alternatives to the screen 200F. For example, the application may transition to the screen 200G as shown in FIG. 2G. The screen 200F is largely similar to the screen 200G. However, the panel 220 in screen 200G includes additional buttons 226a and 226b.

The button 226a provides an option to send a text message to the user associated with the displayed credential 224. If the validating user provides user input selecting the option 226a, the application may trigger the underlying operating system of the client device to launch a text messaging application. In some implementations, the text message application may be native to the underlying operating system and not controlled by the credential management application.

The button 226b provides an option to send an email message to the user associated with the displayed credential 224. If the validating user provides user input selecting the option 226b, the application may trigger the underlying operating system of the client device to launch an email application. In some implementations, the email application may be native to the underlying operating system and not controlled by the credential management application.

When the text messaging application or the email application is launched, the credential management application user interface shown on the device display is replaced by the user interface of the text messaging application or the email application, as the case may be, allowing the user to send a text message or an email respectively. After the text message or email is sent, the user interface of the text messaging application or the email application may be closed and the credential management application user interface again displayed on the device display, returning to the screen that was last visible, e.g., screen 200G.

In some implementations, when the user provides a swiping input on the screen 200C or 200D, the application reverts the user interface to the screen 100A, displaying the user's own credential. If the user provides another input to return to the search screens, then the application may transition the user interface back to the screen that was previously shown (e.g., screen 200C or 200D).

In the manner described in the preceding sections, the credential management application running on the client device may provide in-network and/or cross-network hierarchical visibility of peer devices associated with a common credential issuing organization, with varying permissions based on the system the validating user is a member of (e.g. an employee of Company M may use this functionality to locate other Company M employees). Users may opt-out of the discovery, and administrators of the credential issuing organization may control when and where the discovery may be activated.

Figure 3:
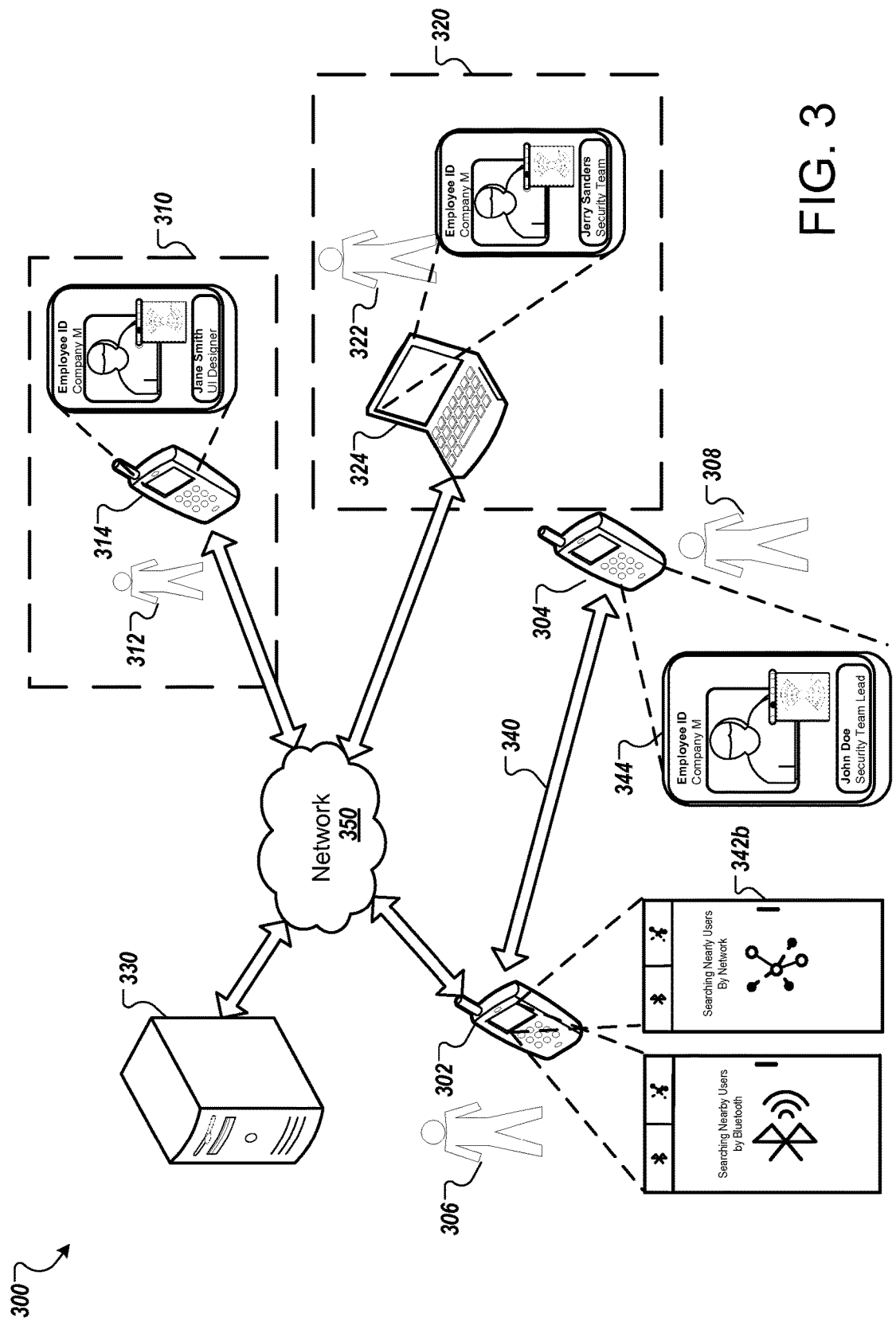
FIG. 3 shows an example system for performing peer discovery using a credential management application.

FIG. 3 shows an example system 300 for performing peer discovery using a credential management application. The system 300 may be a credential management system that is operable to manage and display user credentials associated with the validating client device, or the peer devices, or both. As discussed in the preceding sections, an instance of the credential management application running on the validating client device and that is associated with the credential management system 300 may be used to search for peer devices in a neighborhood of the validating device using the short-range communication protocol, or the long-range communication protocol, or both.

The system 300 includes client devices 302, 304, 314 and 324 that are associated with users 306, 308, 312 and 322 respectively; a validation server 330; and a network 350. The user 312 is at location 310, while the user 322 is at location 320. Direct communication between the client devices 302 and 304 is indicated by 340. UI 342a or 342b is displayed on client device 302 while UI 344 is displayed on the client device 304.

The user 306 may attempt to discover peer users associated with a common credential issuing organization who are located either in the first neighborhood or the second neighborhood of the user 306. The user may perform the peer discovery using the device 302. Users in the first neighborhood, who are in close physical proximity to the user 306, may be discovered by searching using the short-range communication protocol. Users in the second neighborhood, who are spread over a wider geographical area from the user 306, may be discovered by searching using the long-range communication protocol.

As illustrated in FIG. 3, the user 306 may operate the client device 302 (the validating device) to initially discover peer devices in the first neighborhood using the short-range communication protocol. The credential management application running on the validating device 302 presents the UI screen 342a shown on the display coupled to the validating device 302.

A direct communication path may be established between the validating device 302 and the peer device 304 using the short-range communication protocol. Upon performing the peer discovery search performed using the short-range communication protocol, the validating device 302 may receive from the peer device 304 a unique identifier assigned by the credential issuing organization. In addition, the validating device 302 may receive a representation of the credential associated with the user 308 that is issued by the credential issuing organization and stored at the peer device 304, such as the credential shown on the user interface 344 displayed on the peer device 304.

The validating device 302 may determine, based on the unique identifier, that the peer device 304 is associated with the credential issuing organization. Upon making the determination, the device 302 may send the received credential information to the validation server 330 over the network 350. In some implementations, the validating device 302 communicates the credential information to the server 330 in a validation request, along with its own identifying information.

The validation server 330 validates the credential received from the device 302. In some implementations, the server 330 also verifies the identity of the validating user 306 that is included in the validation request. Following successful verification of the peer user's credential and the validator's identity, the server determines what information corresponding to the peer user may be sent to the validating device 302.

In some implementations, the server 330 makes this determination based on instructions configured by the credential issuing organization that issued the credential to the user 308.

Based on determining the information corresponding to the peer user that may be sent to the validating device 302, the server 330 sends a response to the validating device 302 with the determined information. As discussed previously, the information that is shared may include the image, name and title of the user 308, among others.

In some implementations, initial peer discovery phase may be utilized to additionally transmit identification information of the peer device 304 (or the user 308 of the peer device 304). As an example, this identification information may be unique across organizations. In such implementations, the application running on the validating device 302 may utilize the broadcast signal that is received from the peer device 304 during the initial peer discovery phase to both discover the peer device 304 as well as validate the peer device 304, without necessarily being required to use a separate validation phase. This may have the advantage of expediting the validation process by enabling the initial scanning phase to function as both a discovery and a validation phase.

In some implementations, the identification information that is included in the broadcast signal during the peer discovery phase may be used in addition (not as an alternative) to identification information that is transmitted during an additional validation phase. In such cases, the combination of identification information transmitted during the initial discovery phase and the identification information transmitted during a subsequent validation phase may be used to increase the number of unique user identities that are accommodated by the communication protocol.

Figure 6:
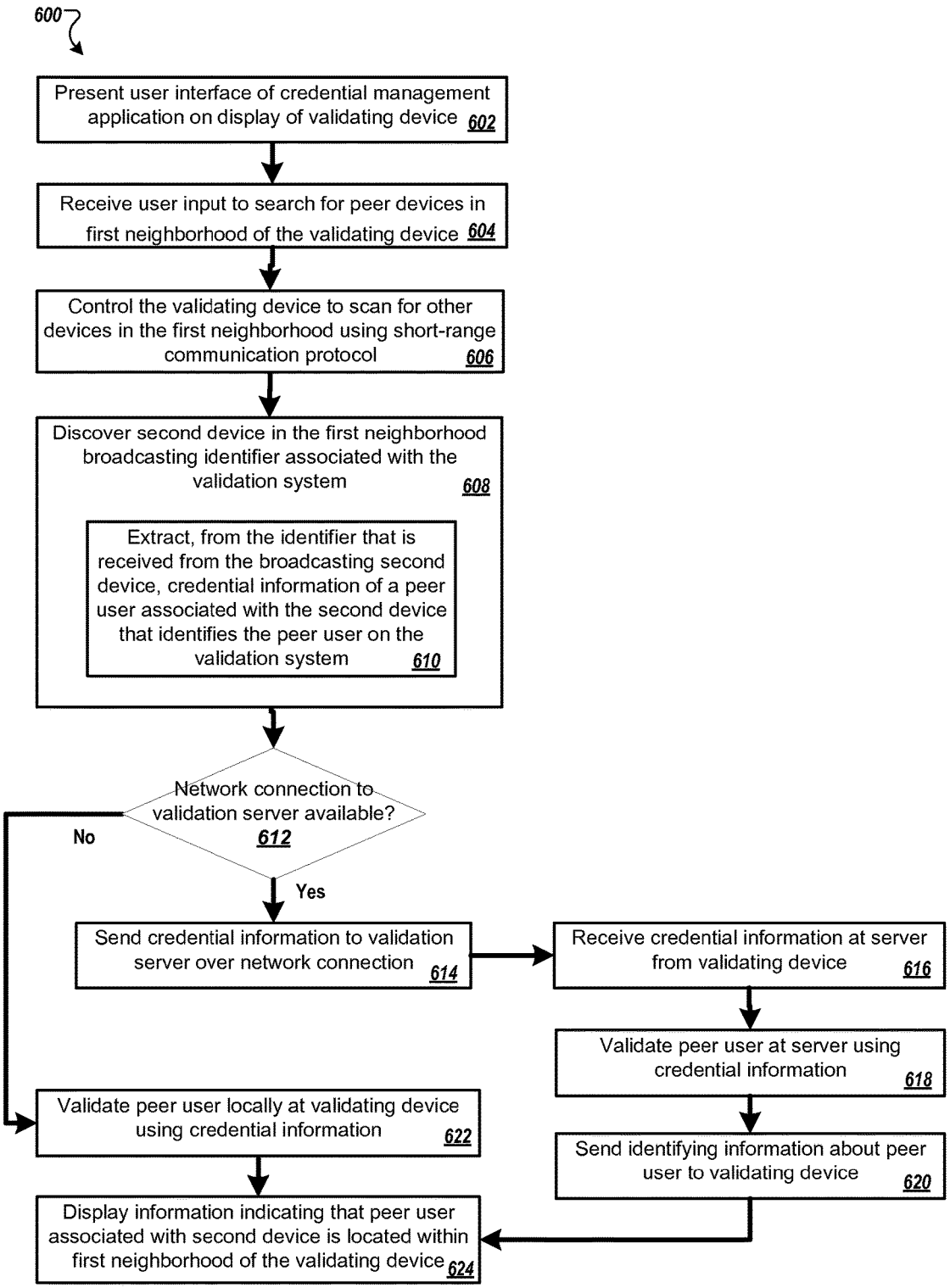
FIG. 6 illustrates an example process for performing a peer discovery search in a first neighborhood of a user initiating the search for other users associated with a common credential issuing organization as the user initiating the search, wherein the peer discovery search includes transmission of credential information for a peer device.

Further details of the process of utilizing identification information in the initial peer discovery phase are explained in Appendix A and in FIG. 6.

In operation, the server 330 manages and/or stores one or more credentials, associates users and groups of users with appropriate credentials, and provides the credentials to users' client devices and/or processing systems (e.g., operated by credential authorities) for validation. The server 330 can be any suitable computer or collection of computers executing software capable of managing, distributing, and/or validating representations of credentials for users and groups of users via a network 350 as described herein.

Credentials, user accounts, group accounts, and administrative accounts can be stored in a database (e.g., MySQL, PostgreSQL, MS SQL Server, MongoDB), or other suitable data structure that can be accessed by the server 330. In some implementations, the server 330 may access the stored credentials and/or user accounts via web services such as representational state transfer (REST) style services.

As an initial step, the server 330 creates a credential based on input provided by a credential issuing organization (e.g., an employer). In some implementations, multiple different credential issuing organizations (e.g., different entities and/or organizations) may issue credentials using the same server 330. The credential may include a variety of information such as a credential identifier (e.g., a number or alphanumeric character string that uniquely identifies a credential), an indication of the grantor of the credential, information about the user to whom the credential issuing organization granted the credential, an indication of one or more permissions granted by the credential issuing organization to the user, a description of an event or location associated with the credential, and/or third-party instructions (e.g., instructions governing what information associated with the user may be disseminated to third party users that request validation of the user's credential).

In some implementations, the instructions may include information identifying a type, classification, or rank of the validator's credential that can be enabled to access private information associated with the validated credential. For example, the private information associated with an employee badge for a company may be shared with the validator when the validator's credential is: (i) an employee badge of the same company; and/or (ii) a manager or supervisor badge associated with another employer that is a business partner of the validatee's company.

Alternatively or in addition, the instructions may include information identifying particular third-parties (e.g., names, credential identifiers, and/or user identifiers) who may access the validatee's private information. In some implementations, the instructions also may include a temporal condition that identifies one or more time periods during which the sharing of private information is enabled. For example, the private information associated with the validated credential may only be accessible during regular business hours. During other time periods, only the public information associated with the validated credential may be accessible.

In some implementations, the server 330 may present a suitable interface to the credential issuing organization for creation of credentials. For example, the server 330 may present a web interface through which the credential issuing organization can interact using a web browser. In other implementations, the server 330 may be directly accessible via a graphical-user interface or an application running on a mobile device. Any suitable interface can be used that enables the creation and storage of credentials, and user accounts. In addition (or as an alternative) to creation of credentials by credential issuing organizations, credentials may be created at the request of registered users through a web-based or other interface, or through any other suitable mechanism such as sending email or short message service (SMS) transmissions to credential issuing organizations. In some implementations, registered users may be able to create credentials by use of an application running on a client device.

The interface for the creation of credentials may provide a credential issuing organization the ability to associate conditions with the credentials, such as instructions for sharing private information associated with the credentials, as discussed above. For example, the interface may show a hierarchical menu of potential third-parties who can access the private information associated with the credential, and allow the credential issuing organization to identify the desired third-parties. These potential third-parties may be identified, for example, by name and/or by a type of credential the third-party must possess to access the private information. For example, the potential third-parties may include particular individuals such as "John Doe," and/or particular credentials such as "Corporate Security Council Badge" or "Company M Employee Badge."

In some implementations, a credential issued by a credential-issuing organization may be represented as any suitable data object, such as an eXtensible Markup Language (XML) or JavaScript Object Notation (JSON) object. In such implementations, the "private" information associated with the credential may be identified within the JSON object. In some implementations, information that is not identified as private may be considered as public information. However, in other implementations, both the private and public information may be explicitly identified.

The following example shows a sample JSON object for a credential, which includes a badge for a user named "John Doe" associated with organization "Company M." The private information in the credential is indicated with the tag "private."

The credential may include different types of private information, which are shown as different attributes in the JSON object associated with the credential. For example, in the exemplary JSON object shown below, the private information includes information on the user's department within the company (indicated as an attribute named "group"), which is of "type" "string" with a value "Administration." The private information also includes the name of the user's supervisor (indicated as an attribute named "supervisor"), which is of "type" "string" with a value "Jane Smith." A validator who is enabled to access the above private information may determine that the user John Doe is in the Administration department in Company M, and the user's supervisor is Jane Smith.

The above may be considered as detailed personal information about the user associated with the credential that is private. The private information also may include user authentication/log-in information, which may be verified by third-party applications when the user attempts to access resources associated with the third-party applications. For example, the exemplary JSON object below includes the user's login name for accessing a particular resource (indicated as an attribute named "login_name"), which is of "type" "string" with a value "john.doe." As another example, the private information includes an access control identifier (shown as attribute "access_control_id") that is of type "number" and has a numerical value "1600341998." The user's login name and the access control identifier may correspond to different resources. For example, the login name may be used to access a web-based email account, while the access control id may be used to unlock a door for accessing a conference room at Company M's premises.

The other information included in the exemplary JSON object below, such as the user's name (e.g., "John Doe"), the user's title (e.g., "Chief Security Officer"), and the organization (e.g., "Company M") may be public information. The JSON object also may include other fields or attributes and their associated values, which are indicated in the example shown below by ellipsis (i.e., " . . . ").

```
{
    "badges":
    [
        {
            "badgeinfo":{
                "name": "John Doe",
                "title": "Chief Security Officer",
                "orgname": "Company M",
                "expiration":31234123, //UNIX timestamp
                "cache_until":1335195206, //UNIX timestamp
                "extra": "jdoe@companym.com",
                "photo": {
                    "desc":...,
                    "type":...,
                    "value":... // or "reference"
                }
            },
            "badgeinfo_additional":[
                {
                    "name":...,
                    "desc":...,
                    "type":...,
                    "value":... // or "reference"
                },
                ...
            ],
            "private":[
                {
                    "name": "group",
                    "type": "string",
                    "value": "Administration"
                },
                {
                    "name": "supervisor",
                    "type": "string",
                    "value": "Jane Smith"
                },
                {
                    "name": "login_name",
                    "type": "string",
                    "value": "john.doe"
                },
                {
                    "name": "access_control_id",
                    "type": "number",
                    "value": "1600341998"
                },
            ],
            "meta": {
                "format": {
                    ...
                }
            }
        },
        {
            ...
        }
    ]
}
```

The server 330 also may present an interface so that users and/or credential issuing organizations can create user accounts for individual users and groups of users. For example, the server 330 may present a web interface through which credential issuing organizations can interact via a Web browser. Additionally or alternatively, the server 330 may be directly accessible via a graphical-user interface or an application on a mobile device. User accounts may be stored in a table or collection of tables in a database, or in any other suitable data structure accessible by the server 330. The user accounts may include a variety of information such as user name, user title, user identifier (e.g., a number or character string that uniquely identifies a user), one or more unique keys for the user (e.g., alphanumeric codes that can be used for encryption and/or decryption), and/or the address(es) of one or more client devices owned by or otherwise associated with the user. Likewise, group accounts may be stored in a table, collection of tables, or any other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device.

As an example, a Mr. John Smith may request a new user account from the server 330 using an application executing on his client device. The server 330 can then create database entries representing a user account for Mr. Smith. A credential issuing organization could then create a row in another table for a group identified as employees of Company X. The grantor and/or server 330 could then link the database entry for Mr. Smith to the group account for Company X through use of a linking table.

Once credentials and users, or groups of users, have been created, credential issuing organizations and/or users can associate the credentials with users, or groups of users. For example, the server 330 may present a web interface through which grantors can interact via a Web browser to link a given credential to a given user or group of users. In other aspects, the server 330 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 330 also may notify the users that they have been associated with the credential(s), for example by pushing notifications to the respective users' client devices. Such notifications may include the credential identifier and/or a key for the user.

As described herein, a key may be any suitable alphanumeric code that is unique to a given user. For example, a key may be a symmetric key or shared secret between the client device and the server that can be used to maintain a private information link. In other implementations, the key may be a private key and/or public key that can be used with a public-key cryptographic system. The key may be of any suitable length such as, for example, 80 bits, 128 bits, or 256 bits. In some implementations, an application executing on the client device may have the key pre-installed, or may receive a key when a user first runs the application and creates a user account associated with the application, or may receive a key when a user logs into the application from the client device. In some implementations, the client device may receive the key from the server in a key exchange (e.g., a Diffie-Hellman key exchange).

Once credentials have been associated with appropriate user and/or group accounts, the credentials can then be distributed to client devices for the appropriate users via the network 350. For example, the network 350 may be a local area network ("LAN") and/or a wide area network ("WAN"), e.g., the Internet. In some versions, the server 330 may communicate with the client devices via SMS or multimedia messaging service (MMS). The server 330 may access user accounts in a database to locate the appropriate users' client devices.

Client devices 302, 304, 314 or 324 can receive the credentials associated with their respective users 306, 308, 312 or 322 and store them in any suitable memory for later retrieval. A given user 306, 308, 312 or 322 may be associated with multiple different credentials. Furthermore, some or all of the credentials associated with a user 306, 308, 312 or 322 may be accessible on a user's client device 302, 304, 314 or 324 respectively. In particular, software applications executing on the client devices 302, 304, 312 or 322 can retrieve the credentials associated with users 306, 308, 314 or 324 respectively, so they can be used for generating and presenting a representation of the credential (e.g., to a validation entity for validation). The client devices 302, 304, 314 or 324 may be any type of computing device, including but not limited to a mobile phone, smart phone, personal digital assistant (PDA), music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

Continuing with the example scenario described previously, upon receiving the identifying information at the validating device 302, the application processes the information and transitions the user interface to display the information about the user 308 who is discovered in the first neighborhood by performing the peer discovery search. For example, the application may transition the user interface from the screen 342a to a screen similar to 100C or 100D.

In some implementations, the user 306 may operate the client device 302 to discover peer users in the second neighborhood using the long-range communication protocol. This may be the case, for example, when a search performed using the short-range communication protocol fails to return any peer user in the first neighborhood. Alternatively, this may be the case when the user 306 wants to find a greater number of peers in a wider area around the validating device, in addition to discovering peers in the immediate first neighborhood. In such cases, the user may interact with the application running on the validating device 302 to initiate a peer discovery search using the long-range communication protocol. Based on the user interaction, the application may present the UI screen 342b shown on the display coupled to the validating device 302.

The device 302 may send the send a message to the validation server 330 over the network 350, requesting information about peer users who are located in the second neighborhood of the validating device 302. The request message may include the device 302's identifying information and also the present location of the device.

Upon receiving the request, the validation server 330 determines the validating device 302's location, and identifies peer users who were located in the second neighborhood of the validating device 302 in a predetermined time period, e.g., in the last 24 hours. The users 312 and 322 may have credentials issued by the same credential issuing organization as the user 306 that are stored in their respective devices 314 and 324. The users 312 and 322 may have performed some physical access in the last 24 hours using the credentials on their respective devices, for example, checking in to the main office building 310, or logging in remotely from a satellite office 320. The users' locations may have been logged by entities of the credential management system (e.g., electronic door reader managed by the credential management system) at each location and transmitted to the validation server 330 over the network 350. The validation server stores the location information associated with the users' devices, along with identifying information about each user.

The identifying the users 312 and 322 as being associated with the same credential issuing organization as the user 306 making the request, the server 330 determines what information corresponding to the users 312 and 322 may be sent to the validating device 302. Then the server 330 sends a response to the validating device 302 with the determined information. As discussed previously, the information that is shared may include the image, name and title of the each user 312 and 322, among others.

Upon receiving the identifying information at the validating device 302, the application processes the information and transitions the user interface to display the information about the users 312 and 322 who are discovered in the second neighborhood by performing the peer discovery search. For example, the application may transition the user interface from the screen 342b to a screen similar to 200C or 200D.

Figure 4:
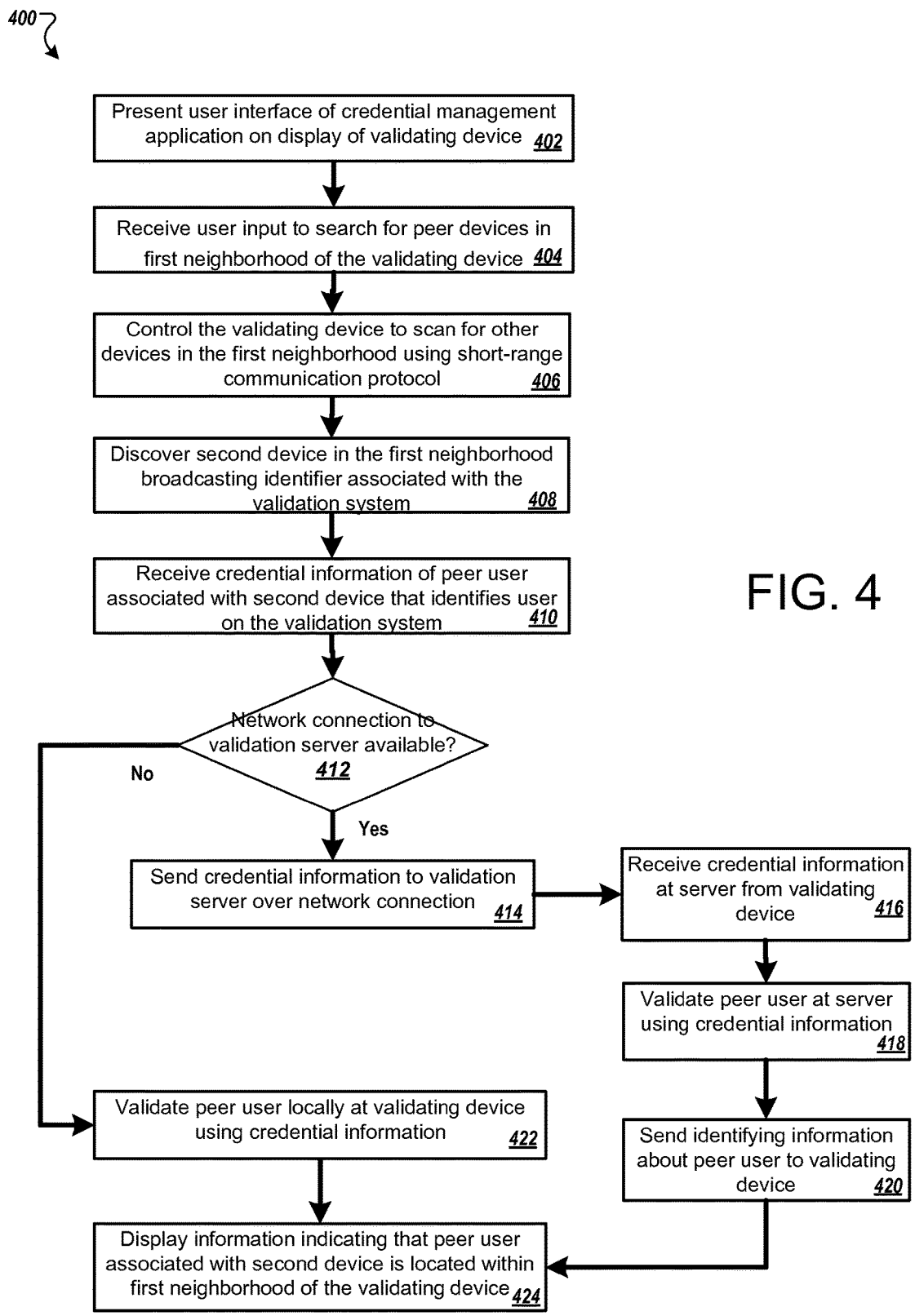
FIG. 4 illustrates an example process for performing a peer discovery search in a first neighborhood of a user initiating the search for other users associated with a common credential issuing organization as the user initiating the search.

FIG. 4 illustrates an example process 400 for performing a peer discovery search in a first neighborhood of a user initiating the search for other users associated with a common credential issuing organization as the user initiating the search. The process 400 may be performed, for example, by the credential management application running on client device 302, in conjunction with the server 330, in an area around the client device that is limited by the transmission range of the short-range communication protocol used for the search. Accordingly, the following description describes the process 400 as performed by the components of the system 300. However, in other implementations, the process 400 also may be performed by other systems, including other client devices and servers.

At 402, the credential management application running on the validating client device presents a user interface associated with the credential management application on a display of the client device. For example, the user 306 may launch the credential management application on the client device 302. Upon launching, the application may present the associated user interface on the device display, with the user interface providing a screen such as 100A that shows a representation of the user 306's own credential.

At 404, the application receives user input to search for peer devices in a first neighborhood of the validating device.

For example, the user 306 may provide the input 112 from the screen 100A to search for peer users who are located in the first neighborhood of the client device 302. The search for peer devices in the first neighborhood may be performed based on direct network connectivity between the client device 302 and the peer devices, using a short-range communication protocol supported by the client device 302, e.g., Bluetooth™, Wi-Fi Direct, or NFC. The geographic range of the first neighborhood may be determined based on the specification of the short-range communication protocol. For example, the short-range communication protocol may be Bluetooth™ version 4.0 or Bluetooth Low Energy (BLE), and the range may be set at 100 meters from the client device 302. Alternatively, the geographic range of the first neighborhood may be configured by the application running on the client device 302.

The peer users are other users who are registered with the same credential issuing organization as the user 306. The credential issuing organization may have issued credentials to the peer users, which may be stored on their respective client devices and managed by instances of the credential management application running on the respective client devices.

Upon receiving the user input, at 406, the application controls the validating device to scan for other devices that are located in the first neighborhood of the validating device, using the short-range communication protocol. For example, the application controls the network resources (e.g., network radio) of the client device 302 to listen for direct wireless communications, i.e., wireless signal transmissions, from other devices that are sent using the short-range communication protocol. In some implementations, the client device 302 will successfully receive the signal transmissions from other devices that are only in close physical proximity, e.g., within a predetermined distance that is associated with the first neighborhood of the client device 302.

Based on the scan, at 408, the application discovers a second device in the first neighborhood of the validating device that is broadcasting an identifier associated with the validation system. For example, the validating device 302 may receive a short-range communication protocol signal transmission from the device 304 that includes a unique identifier associated with the credential issuing organization that issued the credential for the user 306 stored by the validating device 302. The application running on the device 302 receives the identifier from the device and, upon examining the identifier, determines that the device 304 is a peer device that is registered with the common credential issuing organization. Since the identifier is received using the short-range communication protocol signal transmission, the application also determines that the device 304 is located in the first neighborhood of the validating device 302.

At 410, the application receives credential information of a peer user associated with the second device that identifies the user on the validation system. For example, the application running on the validating device 302 receives, from the instance of the application running on the peer device 304, a representation of a credential of the user 308 associated with the device 304. The credential is issued by the credential issuing organization that issued the user 306's credential, and it uniquely identifies the user 308 to the credential management system.

In some implementations, the credential information received at 410 may be received in a separate validation phase (subsequent to the discovery step in 408). In some implementations, additional or alternative credential information may be received during the discovery step 408.

Another example in which credential information is received during a peer discovery phase is described with reference to FIG. 6, below.

At 412, the application checks whether a network connection to the validation server is available. For example, the client device 302 checks whether the validation server 330 is reachable via a network connection established over the network 350.

In some implementations, the application may send a "heartbeat" message to the server 330 and check whether a response to the message is received within a timeout period. If a response is received, then the validation server 330 is accessible over the network connection. However, if a response is not received, or a message is received indicating that a network path could not be established, then the application determines that the validation server is not accessible over a network connection.

In some implementations, the application may directly send a validation request message to the server 330 over the network 350, and check whether a response to the message is received within a timeout period. The validation request message may include the credential information of the peer user. If a response is not received within the timeout period, then the application determines that the validation server is not available over the network connection.

If the application determines that a network connection to the server is available, then, at 414, the application sends the credential information to the validation server over the network connection. For example, the client device 302 sends a message to the server 330 over the network 350. The message may include the credential information received from the device 304 along with the client device 302's own identifying information. The message may request the server 330 to validate the credential of the user 308 based on the credential information included in the message, and return to the client device 302 identifying information associated with the user 308.

At 416, the server receives the credential information from the validating device. For example, the server 330 receives a message from the client device 302 that includes credential information associated with the user 308, and information identifying the user 306 associated with the device 302.

At 418, the server validates the peer user using the credential information. For example, as described previously, the server 330 verifies the identity of the user 306 based on the identifying information included in the message received from the client device 302. The server also checks whether credential associated with the user 308 based on the credential information included in the message, and determines whether the credential is valid, i.e., whether it is a bona fide credential issued by the credential issuing organization indicated by the credential and whether it is still active.

At 420, the server sends identifying information about the peer user to the validating device. For example, if the identity of the user 306 is verified, and the validity of the credential associated with the user 308 is confirmed, the server 330 determines, as described previously, what identifying information associated with the user 308 to send to the requesting device 302. The information may include an image associated with the user that is included in the credential representation, and name and title of the user, or any other suitable information. The server retrieves the information and sends it to the validating device 302 over the network connection through the network 350.

If, upon checking at 412 whether a network connection to the validation server is available, the application determines that a network connection to the server is not available, then, at 422, the application validates the peer user locally at the validating device using the credential information. For example, the application running on the validating device 302 may receive, from the peer device 304, additional identifying information corresponding to the user 308. The application uses the credential information and the additional identifying information received from the device 304 to validate the credential associated with the peer user 308 locally in offline mode, without accessing the resources of the server 330.

When the credential is validated, either based on information received from the server at 420, or based on local validation at 422, then, at 424, the application displays information indicating that a peer user associated with the second device is located within the first neighborhood of the validating device. For example, when the application running on the validating device 302 receives, from the server 330, the identifying information about the peer user 308, this indicates to the application that the credential associated with the user 308 is successfully validated. Alternatively, the application determines that the credential associated with the user 308 is valid based on local validation at 422. In either case, the application displays the identifying information associated with the user 308 using any of the screens 100C, 100D, 100E, 100G or 100H of the user interface shown on the display of the device 302. The identifying information associated with the user 308 displayed using any of the screens 100C, 100D, 100E, 100G or 100H indicates that the user 308 is located in the first neighborhood of the client device 302, and the user is discovered by performing a peer discovery search using the short-range communication protocol.

Figure 5:
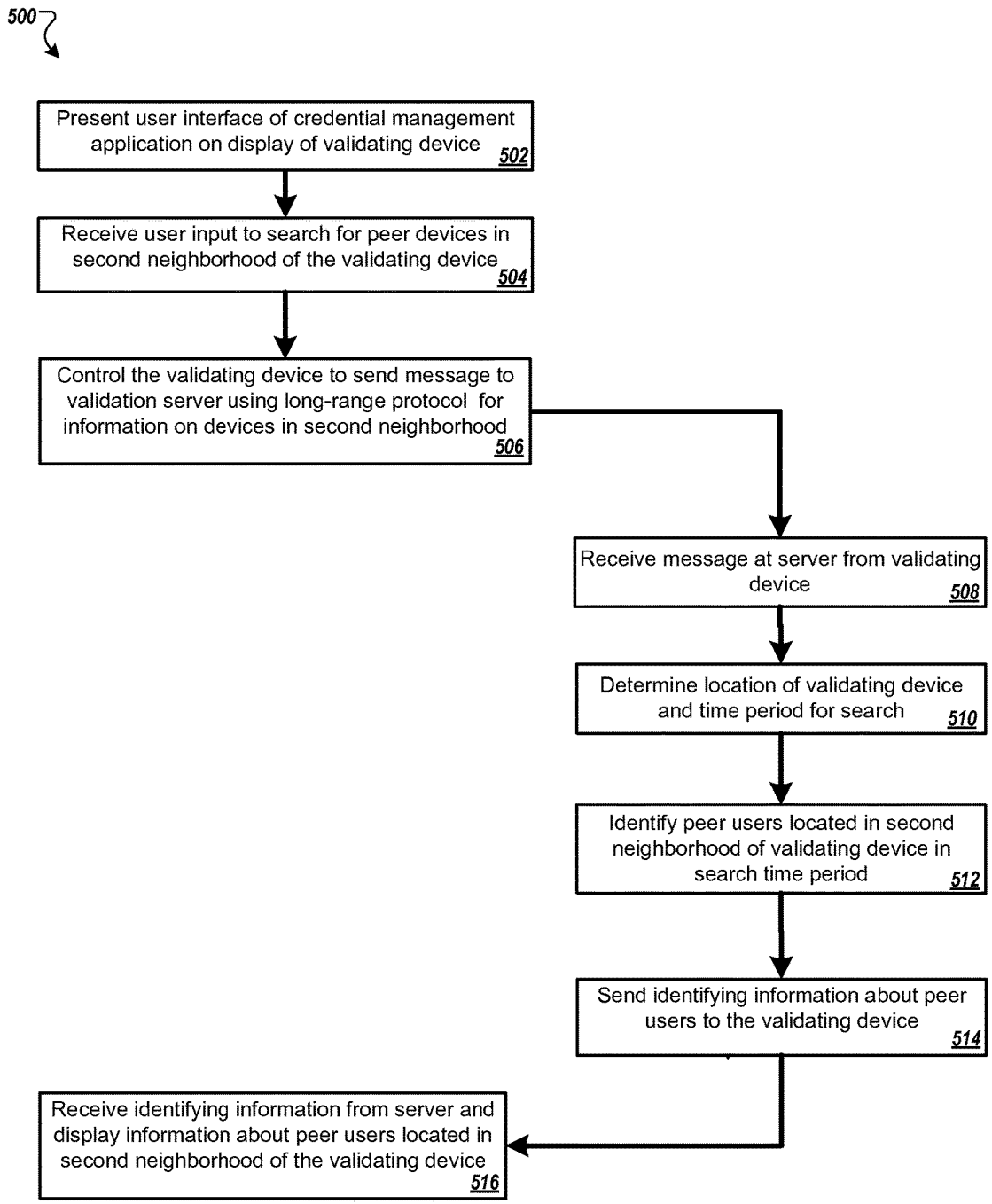
FIG. 5 illustrates an example process for performing a peer discovery search in a second neighborhood of a user initiating the search for other users associated with a common credential issuing organization as the user initiating the search.

FIG. 5 illustrates an example process 500 for performing a peer discovery search in a second neighborhood of a user initiating the search for other users associated with a common credential issuing organization as the user initiating the search. The process 500 may be performed, for example, by the client device 302, in conjunction with the server 330, in an wide geographic area around the client device that is beyond the transmission range of the short-range communication protocol used for the process 400. In some implementations, the process 500 may be performed in conjunction with the process 400. For example, the user may initially search the first neighborhood using the process 400, and then switch to searching the second neighborhood using the process 500. Accordingly, the following description describes the process 500 as performed by the components of the system 300. However, in other implementations, the process 500 also may be performed by other systems, including other client devices and servers.

At 502, the credential management application running on the validating client device presents a user interface associated with the credential management application on a display of the client device. For example, the user 306 may launch the credential management application on the client device 302. Upon launching, the application may present the associated user interface on the device display, with the user interface providing a screen such as 100A that shows a representation of the user 306's own credential. Alternatively, the user 306 may have performed a prior search in the first neighborhood of the client device 302 using the process 400 and the application may present a user interface screen, such as 100L, associated with the prior search.

At 504, the application receives user input to search for peer devices in the second neighborhood of the validating device. For example, the user 306 may provide the input 112 from the screen 100A, and then select the tab 116 to search for peer users who are located in the second neighborhood of the client device 302. Alternatively, the user may provide input selecting the button 158, or the tab 116, from the screen 100L.

The search for peer devices in the second neighborhood may be performed using one or more communication protocols supported by the client device 302 that are configured for communication covering distances greater than that possible using a short-range communication protocol. For example, the communication protocols may be IEEE 802.11, LTE, WiMAX, other 3G, 4G or 5G protocols, Ethernet, Internet connections, among others. The geographic range of the second neighborhood may be configured by the credential issuing organization and may be set to a distance greater than direct connection range of the client device 302, e.g., 3 miles.

As described previously, the peer users are other users who are registered with the same credential issuing organization as the user 306. The credential issuing organization may have issued credentials to the peer users, which may be stored on their respective client devices and managed by instances of the credential management application running on the respective client devices.

Upon receiving the user input, at 506, the application controls the validating device to send a message to a validation server using a long-range protocol for information on devices in the second neighborhood. For example, the application controls the network resources (e.g., network radio) of the client device 302 to send network communications to the validation server 330 over the network 350, where the network connection is established using one or more of the long-range protocols identified above. The message requests the server 330 to return results including information about peer devices that are determined to be within the second neighborhood of the client device 302. The message may include the client device 302's identifying information, and the present location of the client device. The present location of the client device may be determined using location services available at the client device, e.g., using GPS positioning or wireless triangulation.

At 508, the message from the validating device is received at the server. For example, the server 330 receives, through an API provided by the server, a request message from the client device 302 that includes information identifying the user 306 associated with the device 302, and information about the location of the client device 302.

At 510, the server determines the location of the validating device and the time period for search. For example, the server 330 notes the location of the client device 302 from the location information included in the request message, and also notes the time the request message was sent.

In some implementations, the location of the client device determines the second neighborhood of the client device 302, which may be a geographic area centered on the determined location of the client device 302 and having a radius configured by administrator of the credential issuing organization, e.g., 3 miles. The time the request message was sent determines the search period. For example, the search period may cover the predetermined time period (e.g., 24 hours) in the past from the time the request message was sent. The predetermined time period may be set by the administrator of the credential issuing organization.

At 512, the server identifies peer users located in the second neighborhood of the validating device in the search time period. For example, as described previously, the server 330 logs the locations of the devices of peer users whenever they perform some form of physical access using a resource associated with the credential management system (e.g., a door reader). The server 330 checks its stored information and identifies the users associated with the credential issuing organization who had logged their locations in the second neighborhood of the validating device 302 within the search time period. For example, the server may determine that the last-logged locations of users 312 and 322 are in the second neighborhood of the device 302, and the users 312 and 322 had logged their locations within the search time period.

At 514, the server sends identifying information about the peer users to the validating device. For example, upon identifying the peer users 312 and 322 based on their logged locations, the server 330 determines, as described previously, what identifying information associated with users 312 and 322 to send to the requesting device 302. For each user, the information may include an image associated with the user that is included in the user's credential representation, and name and title of the user, or any other suitable information. The server retrieves these information and sends the information to the validating device 302 over the network connection through the network 350.

At 516, the application receives the identifying information from the server and displays information about peer users who are located in the second neighborhood of the validating device. For example, when the application running on the validating device 302 receives, from the server 330, the identifying information about peer users 312 and 322, the application displays the identifying information associated with the users 312 and 322 on the screen 200C of the user interface shown on the display of the device 302. The identifying information associated with the users 312 and 322 displayed on the screen 200C indicates that the users 312 and 322 are located in the second neighborhood of the client device 302, and the users have been discovered by performing a peer discovery search in the second neighborhood of the validating device 302.

FIG. 6 illustrates an example process 600 for performing a peer discovery search in a first neighborhood of a user initiating the search for other users associated with a common credential issuing organization as the user initiating the search. In the example of FIG. 6, the user initiating the search also receives, during the peer discovery process, credential information for a peer device. The process 600 may be performed, for example, by the credential management application running on client device 302, in conjunction with the server 330, in an area around the client device that is limited by the transmission range of the short-range communication protocol used for the search. Accordingly, the following description describes the process 600 as performed by the components of the system 300. However, in other implementations, the process 600 also may be performed by other systems, including other client devices and servers.

At 602, the credential management application running on the validating client device presents a user interface associated with the credential management application on a display of the client device. For example, the user 306 may launch the credential management application on the client device 302. Upon launching, the application may present the associated user interface on the device display, with the user interface providing a screen such as 100A that shows a representation of the user 306's own credential.

At 604, the application receives user input to search for peer devices in a first neighborhood of the validating device. For example, the user 306 may provide the input 112 from the screen 100A to search for peer users who are located in the first neighborhood of the client device 302. The search for peer devices in the first neighborhood may be performed based on direct network connectivity between the client device 302 and the peer devices, using a short-range communication protocol supported by the client device 302, e.g., Bluetooth™, Wi-Fi Direct, or NFC. The geographic range of the first neighborhood may be determined based on the specification of the short-range communication protocol. For example, the short-range communication protocol may be Bluetooth™ version 4.0 or Bluetooth Low Energy (BLE), and the range may be set at 100 meters from the client device 302.

Alternatively, the geographic range of the first neighborhood may be configured by the application running on the client device 302.

The peer users are other users who are registered with the same credential issuing organization as the user 306. The credential issuing organization may have issued credentials to the peer users, which may be stored on their respective client devices and managed by instances of the credential management application running on the respective client devices.

Upon receiving the user input, at 606, the application controls the validating device to scan for other devices that are located in the first neighborhood of the validating device, using the short-range communication protocol. For example, the application controls the network resources (e.g., network radio) of the client device 302 to listen for direct wireless communications, i.e., wireless signal transmissions, from other devices that are sent using the short-range communication protocol. In some implementations, the client device 302 will successfully receive the signal transmissions from other devices that are only in close physical proximity, e.g., within a predetermined distance that is associated with the first neighborhood of the client device 302.

Based on the scan, at 608, the application discovers a second device in the first neighborhood of the validating device that is broadcasting an identifier associated with the validation system. For example, the validating device 302 may receive a short-range communication protocol signal transmission from the device 304 that includes a unique identifier associated with the credential issuing organization that issued the credential for the user 306 stored by the validating device 302. The application running on the device 302 receives the identifier from the device and, upon examining the identifier, determines that the device 304 is a peer device that is registered with the common credential issuing organization. Since the identifier is received using the short-range communication protocol signal transmission, the application also determines that the device 304 is located in the first neighborhood of the validating device 302.

During the discovery process in 608, the validating device may additionally receive credential information in the broadcast signal from the peer device. In the example of FIG. 6, at sub-step 610, the application receives credential information of a peer user associated with the second device that identifies the user on the validation system. For example, the application running on the validating device 302 receives, from the instance of the application running on the peer device 304, a representation of a credential of the user 308 associated with the device 304. The credential is issued by the credential issuing organization that issued the user 306's credential, and it uniquely identifies the user 308 to the credential management system.

In some implementations, an additional step may be included in which the validating device receives additional credential information from the peer device in a separate validation phase (e.g., as in 410 of FIG. 4).

At 612, the application checks whether a network connection to the validation server is available. For example, the client device 302 checks whether the validation server 330 is reachable via a network connection established over the network 350.

In some implementations, the application may send a "heartbeat" message to the server 330 and check whether a response to the message is received within a timeout period. If a response is received, then the validation server 330 is accessible over the network connection. However, if a response is not received, or a message is received indicating that a network path could not be established, then the application determines that the validation server is not accessible over a network connection.

In some implementations, the application may directly send a validation request message to the server 330 over the network 350, and check whether a response to the message is received within a timeout period. The validation request message may include the credential information of the peer user. If a response is not received within the timeout period, then the application determines that the validation server is not available over the network connection.

If the application determines that a network connection to the server is available, then, at 614, the application sends the credential information to the validation server over the network connection. For example, the client device 302 sends a message to the server 330 over the network 350. The message may include the credential information received from the device 304 along with the client device 302's own identifying information. The message may request the server 330 to validate the credential of the user 308 based on the credential information included in the message, and return to the client device 302 identifying information associated with the user 308.

At 616, the server receives the credential information from the validating device. For example, the server 330 receives a message from the client device 302 that includes credential information associated with the user 308, and information identifying the user 306 associated with the device 302.

At 618, the server validates the peer user using the credential information. For example, as described previously, the server 330 verifies the identity of the user 306 based on the identifying information included in the message received from the client device 302. The server also checks whether credential associated with the user 308 based on the credential information included in the message, and determines whether the credential is valid, i.e., whether it is a bona fide credential issued by the credential issuing organization indicated by the credential and whether it is still active.

At 620, the server sends identifying information about the peer user to the validating device. For example, if the identity of the user 306 is verified, and the validity of the credential associated with the user 308 is confirmed, the server 330 determines, as described previously, what identifying information associated with the user 308 to send to the requesting device 302. The information may include an image associated with the user that is included in the credential representation, and name and title of the user, or any other suitable information. The server retrieves the information and sends it to the validating device 302 over the network connection through the network 350.

If, upon checking at 612 whether a network connection to the validation server is available, the application determines that a network connection to the server is not available, then, at 622, the application validates the peer user locally at the validating device using the credential information. For example, the application running on the validating device 302 may receive, from the peer device 304, additional identifying information corresponding to the user 308. The application uses the credential information and the additional identifying information received from the device 304 to validate the credential associated with the peer user 308 locally in offline mode, without accessing the resources of the server 330.

When the credential is validated, either based on information received from the server at 620, or based on local validation at 622, then, at 624, the application displays information indicating that a peer user associated with the second device is located within the first neighborhood of the validating device. For example, when the application running on the validating device 302 receives, from the server 330, the identifying information about the peer user 308, this indicates to the application that the credential associated with the user 308 is successfully validated. Alternatively, the application determines that the credential associated with the user 308 is valid based on local validation at 622. In either case, the application displays the identifying information associated with the user 308 using any of the screens 100C, 100D, 100E, 100G or 100H of the user interface shown on the display of the device 302. The identifying information associated with the user 308 displayed using any of the screens 100C, 100D, 100E, 100G or 100H indicates that the user 308 is located in the first neighborhood of the client device 302, and the user is discovered by performing a peer discovery search using the short-range communication protocol.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

APPENDIX A

Some peer-to-peer communication protocols typically suffer a delay as a result of validating a peer device. For example, a BLE (Bluetooth Low Energy) connection typically requires the transmission of a validation code after a peer device has been discovered. In addition, there may be stability problems for such connections on some operating systems.

In some implementations, credential information (e.g., a Bluetooth validation code) can be transmitted during the initial discovery phase (e.g., during the advertisement of UUIDs in the Bluetooth protocol). The credential information may be made short enough (with reasonable security level) so that the credential information can be included, for example, into BLE advertisement data. As a result, in some implementations, this may have the advantage of reducing the necessity of requiring additional BLE connections so that performance and stability can be improved.

A1. Overview

A1.1. Hashed Service UUIDs

On some operating systems (e.g., iOS), for background advertising, only hashed service UUIDs can be used. There are only 128 different hash results. Each hash result corresponds to one bit in the advertising data. These 128 bits could be affected by all the BLE applications ("apps") on the same iOS device. (For example, there are two apps A and B which are advertising BLE data. App A is advertising Service A. App B is advertising Service B and service C. If Service A, B, C are hashed to different results, there will be 3 "1" bits and 125 (128−3) "0" bits in background advertising data. See below for some rules about how iOS hashes the service UUIDs.)

A1.2. Service UUID Combinations

Usually, one BLE app only advertises one service ID. If a user's device wants to distinguish different devices from the background advertising data, the device can use a combination of service UUIDs. The maximum number of different combinations (without any limitation) is typically $2^{128}$. To reduce interference of other BLE apps as much as possible, there may be some limitations imposed on the combinations. For example, a combination of 8 service IDs may be chosen from 33 service IDs to represent a 7 digit number (if there are more than 10,000,000 different combinations for C(33,8)). A drawback of this method may be a difficulty in separating a meaningful combination of service IDs from all the service IDs which are advertised by multiple BLE apps. In some implementations, a fallback method may be used when the service UUID combination cannot be recognized. Moreover, there is a chance for multiple service IDs being hashed to the same result. When this happens, a peripheral can be discovered even when the scanned service IDs does not contain the advertised service ID.

With fixed number of selected UUIDs, the maximum number of combinations is $C(128, 64)=2.395*10^{37}$ (about $2^{124} \sim 2^{125}$). In some implementations, the system may reserve some service UUIDs to reduce the probability of interference by other background BLE apps. For example, consider reserving 64 UUIDs, the maximum number of combinations is $C(64, 32)=1.833*10^{18}$ (about $2^{60} \sim 2^{61}$). So as long as the validation code is no more than 18 digits or 60 bits (7.5 bytes), this may be sufficient.

A1.3. Foreground Advertising

In some implementations and for some operating systems (e.g., iOS), in foreground, only a list of service UUIDs and a local name may be specified in the advertisement. Some examples of analyses for different cases is presented below.

1. When only one service UUID is advertised, if a central is scanning for a list of UUIDs including this UUID, the whole string of this service UUID is available under CBAdvertisementDataServiceUUIDsKey.

2. When a 16 bit service UUID and an 128 bit service UUID are advertised, if a central is scanning for a list of UUIDs including any of these UUIDs, both UUIDs are available under CBAdvertisementDataServiceUUIDsKey.

3. When two or more 128 bit service UUIDs are advertised, if any service UUID except the first service UUID is scanned, it should be available under CBAdvertisementDataOverflowServiceUUIDsKey. For the first service ID, sometimes it is available under CBAdvertisementDataServiceUUIDsKey. Sometimes it is not (e.g., when the peripheral is older than iOS 7.1).

4. When the hashed service UUID list is not empty and there's only a 16 bit service UUID under CBAdvertisementDataServiceUUIDsKey, the first 22 bytes of the local name is available.

5. When the hashed service UUID list is not empty and there's a 128 bit service UUID under CBAdvertisement-DataServiceUUIDsKey, only the first 8 bytes of the local name is available.

6. When the hashed service UUID list is empty, the first 29 bytes of the local name is available. In some implementations, an operating system may not allow use of a 16 bit service UUID. In such cases, the system may not be able to take advantage of Item 2 above. In such cases, the system may only use an 8 byte string for local name. Consider using Base64 encoding, we can use at most 8*3/4=6 bytes (or 48 bit) for validation code in foreground.

A1.4. Features

In some implementations, the system may have the advantage of overcoming various difficulties. For example, the system may be able to identify a user even without using an organization ID along with a code from the same organization. A user may have a user ID which is unique across organizations (e.g., in a BLE validation code). For example, the application may use a 27 bit user ID, which can support 2^27=134 million users.

In some implementations, the system may also have the advantage of security. There may be different requirements for different scenarios (e.g., for a peer-to-peer (P2P) scenario versus a DoorReader scenario).

For P2P discovery, the system may use a discovery ID only to minimize the number of advertising service UUIDs. So the system may be able to avoid BLE connection for most cases.

For P2P or DR validation, the system may need higher security level. The period for a validation code may be designed, for example, as 2 seconds. The same validation code may be only accepted once by the same validator within a specified time period (e.g., 6 seconds) (previous period, current period and next period). The same validation code can be used by multiple validators. So a server may be able to accept the same validation code multiple times as long as the Door code is different.

A2. BLE Validation Code

A2.1 BLE Validation Code in Server

In some implementations, a validation code format that may be supported by a server. An example of a validation code is: [22 bit discovery ID]+[19 bit device code], where the "device code" may be changed periodically (e.g., every 10 seconds). In some implementations, this code may be accepted by the server an unlimited number of times as long as the code is valid.

A2.2 Foreground BLE Validation Code in Peripheral

The foreground BLE Validation code may be, for example, a 48 bit code which may be designed as follows, as an example: [2 bit_code_type]+[2 bit_reserved]+[22 bit_discovery_ID]+[19 bit_device code]+[1bit_P2P_option]+[2 bit server URL index], where period=10 by default, for example.

Examples of supported server URL lists with indices can be found in Appendix 2. In some implementations, for a server URL which cannot be put into this list, the server index may be, for example, 3. There may be various reasons why a 2-bit server URL index is necessary. For example, (1) the server URL index may be used as the filter to filter out most users which are using different server URLs; (2) the DoorReader may need the server URL index to send a request to a related server to open the door.

The 1 bit_P2P_option specifies whether this user allows to be found by P2P. Foreground BLE validation code may be put into a local name with Base64 encoding.

A2.3 Background BLE Validation Code in Peripheral

In some implementations, the Background BLE Validation code may be a 51-bit code which uses similar format to the foreground BLE validation code in Section A2.2, above. In some implementations, the main difference may be that the local name is not available in background advertising. In such implementations, the system may use a service ID combination to represent the validation code.

The service ID combination for BLE validation code may, in some examples, include three parts (32+19 bits).

Part 1: 32 Bits

[2 bit_code_type]+[2 bit_reserved]+[22 bit_discovery_ID]+[1 bit_P2P_option]+[2 bit server URL index]+[3 bit_reserved]

Considering that the number of possible combinations C(34, 17)<2^32<C(35,17), the system may choose 17 service IDs from the following 35 UUIDs.

*00~*14, *16~*23 (where *=first_120_bits_of (base service UUID))

See Appendix 3 for a list of base service UUIDs.

Part 2: 19 Bits

[19 bit_device code]

Considering that the number of possible combinations C(21, 11)<2^19<C(22,11), the system may choose 11 service IDs from the following:

22 UUIDs.

*24~*39

In some implementations, Part 2 may not be available when the application is in suspend mode.

A3. BLE P2P Discovery Workflow

In some implementations, a BLE scanner scans the following (35+1=36) service UUIDs. *00*14, *16*23, base service UUID (where *=first_120_bits_of (base service UUID))

If the scanner cannot see base service UUID in the advertisement, the scanner may ignore the peripheral.

Scenario 1: (Background, No Interference Apps)

1. A peripheral is advertising its discovery ID in background.

2. A BLE scanner sees 17 service UUIDs within *00-*14, *16-*23,

3. The BLE scanner converts the 17 service UUID into a 32-bit code. The code is then parsed to get a discovery ID based on the format in Relatively Secure Connectionless BLE communication.

4. The scanner will get related badge from cache and send a server request to server to get the latest badge for the discovery ID. If no user is found, ignore this peripheral. Otherwise, go to the next step.

5. The scanner will display discovered badge within the same organization as scanner's badge. The status is "not validated".

Scenario 2: (Foreground)

1. A peripheral is advertising its discovery ID in local name.

2. A BLE scanner sees a Base64 encoded 8 bytes string.

3. The BLE scanner converts the 8 bytes string into a 48 bit code. The code is then parsed based on the format in Relatively Secure Connectionless BLE communication. If the code does not include a discovery ID, then skip it.

4. Same as Step 4 in Scenario 1.

When there are interference apps at background, we can use BLE connection to fetch validation code and discovery ID.

A4. BLE DoorReader Validation

In some implementations, in high security mode, Door-Reader may be configured to send both the discovery ID and device code to a server for validation.

Appendix 1: Some Rules about how iOS Hashes the Service UUIDs

In some implementations, the system may use some rules for hashing the service UUIDs. For example, the following service UUIDs may be hashed to 128 different results:

*00, *01, . . . , *7E, *7F (where *=d2bd45f0fb9d31828ee7e379000000).

The following service UUIDs may be hashed to the same result (00<=xy<=7F):

d2bd45f0fb9d31828ee7e379000000xy
d2bd45f0fb9d31828ee7e3790000a1xy
d2bd45f0fb9d31828ee7e379000109xy
. . . .
d2bd45f0fb9d31828ee7e379000ccdxy Appendix 2 Server URL List Index 0; Name "PROD"; URL https://uvsv2.usher.com
Index 1; Name "TEST"; URL https://idm.test.usher.com:9500/
Index 2: Name "UAT"; URL https://uat.test.usher.com:9500/
Index 3; Name "MIRROR"; URL https://uat.test.usher.com:9500/

Appendix 3 Base Service UUID List

In some implementations, apps with different bundle IDs may use different base service UUIDs. The base service UUID may be the first service UUID in the advertising service ID list. Base service UUID may be configured to support BLE connections.

Index 0; Base Service UUID "d2bd45f0fb9d31828ee7e3790000007f"; App Bundle ID: "com.universalclient"
Index 1; Base Service UUID "d2bd45f0fb9d31828ee7e3790000a17e"
Index 2; Base Service UUID "d2bd45f0fb9d31828ee7e3790001097d"
Index 3; Base Service UUID "d2bd45f0fb9d31828ee7e3790001a87c"
. . . .
Index 15; Base Service UUID "d2bd45f0fb9d31828ee7e37900094170"

Appendix 4 Hashed Service UUID Range and Usage Table

Range: *15; Usage: SBA server 2.0
Range: *65; Usage: Usher Identity (world app)
Range: *74; Usage: SBA server 1.0
. . . .
Range *70-*73, *75 *7f; Group Count: 15, Select Count: 1; Bits: 4; Usage: Base service UUID for BLE connection. Apps with different bundle IDs should use different base service UUIDs. See Appendix 3 for more details.

Appendix 5 Sample Service UUID Combination for Discovery ID

An example of an advertisement at background in suspend mode is given below.

advertisement:{
kCBAdvDataChannel=39;
kCBAdvDataHashedServiceUUIDs=(
"Unknown (<d2bd45f0 fb9d3182 8ee7e379 0000007­f>)",
"Unknown (<d2bd45f0 fb9d3182 8ee7e379 000000­00>)",
"Unknown (<d2bd45f0 fb9d3182 8ee7e379 000000­01>)",
"Unknown (<d2bd45f0 fb9d3182 8ee7e379 00000­002>)",
"Unknown (<d2bd45f0 fb9d3182 8ee7e379 000000­03>)",
"Unknown (<d2bd45f0 fb9d3182 8ee7e379 000000­04>)",
"Unknown (<d2bd45f0 fb9d3182 8ee7e379 000000­06>)",
"Unknown (<d2bd45f0 fb9d3182 8ee7e379 000000­07>)",
"Unknown (<d2bd45f0 fb9d3182 8ee7e379 000000­08>)",
"Unknown (<d2bd45f0 fb9d3182 8ee7e379 00000­00b>)",
"Unknown (<d2bd45f0 fb9d3182 8ee7e379 00000­00c>)",
"Unknown (<d2bd45f0 fb9d3182 8ee7e379 00000­00d>)",
"Unknown (<d2bd45f0 fb9d3182 8ee7e379 00000­00e>)",
"Unknown (<d2bd45f0 fb9d3182 8ee7e379 00000­00f>)",
"Unknown (<d2bd45f0 fb9d3182 8ee7e379 00000­010>)",
"Unknown (<d2bd45f0 fb9d3182 8ee7e379 00000­011>)",
"Unknown (<d2bd45f0 fb9d3182 8ee7e379 00000­012>)",
"Unknown (<d2bd45f0 fb9d3182 8ee7e379 000000­14>)"
);
kCBAdvDataIsConnectable=1;
}

Combination to Discovery ID:

The first UUID *7f is base service UUID. The rest 17 UUIDs are for discovery ID. The combination can be simplified as (0,1,2,3,4,6,7,8,11,12,13,14,15,16,17,18,20) in decimal. The represented discovery ID is 1947. The calculation is as follows.

$$C(20,17)+C(18,16)+C(17,15)+C(16,14)+C(15,13)+C(14,12)+C(13,11)+C(12,10)+C(11,9)+C(8,8)+C(7,7)+C(6,6)=1947$$

Generically, for 17 integers $a1<a2<\ldots<a17$, the formula is as follows.

$$n=C(a17,17)+C(a16,16)+\ldots+C(a1,1)$$

(If $C(ai<i)$, $C(ai, i)=0$. Otherwise, $C(ai, i)$ is the combination number for selecting i from ai.)

Discovery ID to Combination:

An example of python code for generating a combination from an unsigned integer n to a combination for selecting s from g is given below. (For the example above, n=1947, g=35, s=17)

```
#!/usr/bin/python
def C(g, s):
r=1
for i in range(0, s):
r=r*(g i)
for i in range(0, s):
r=r/(s i)
return r
def int2comb(n, g, s):
if g==s:
for i in range(0, g):
print i
return
if s==0:
return
if g>s:
c=C(g 1,
s)
```

```
if n>=c:
    if s>1:
        int2comb(n c,
            g 1,
            s 1)
        print (g1)
    else:
        int2comb(n, g 1,
            s)
int2comb(1947,35,17)
```

The invention claimed is:

1. A method comprising:
presenting, by a first device of a first user, a user interface on a display coupled to the first device, wherein the user interface is provided using an application associated with a validation system used by the first device;
receiving, through the user interface, a first user input that initiates a search for other devices that are associated with the validation system and that are located within a first communication range of the first device that enables exchange, with the first device, of direct wireless communications using a first communication protocol;
based on receiving the first user input, controlling the first device to scan, using the first communication protocol, for at least one signal transmitted by other devices that are located within the first communication range of the first device that enables exchange, with the first device, of direct wireless communications using the first communication protocol;
based on the scan, detecting, by the first device, a signal from a second device that is located within the first communication range of the first device and that is broadcasting the signal according to the first communication protocol, the signal from the second device including a representation of a credential issued to a user of the second device by a credential authority that issued a first credential to the first user;
determining, based on the representation of the credential of the user of the second device included in the signal from the second device and by the first device, (i) an identifier that is uniquely associated with the second device on a network using the first communication protocol, and (ii) credential information that identifies the credential issued to the user of the second device by the credential authority;
validating, by the first device, the second device by verifying that the identifier that is uniquely associated with the second device corresponds to identification information for the user of the second device;
validating, by the first device, the credential information that identifies the credential issued to the user of the second device by the credential authority, by communicating with a validation server associated with the validation system to verify that (i) the credential was issued by the credential authority and (ii) the credential is currently active; and
based on validating the credential information, displaying, by the first device, an indication that the second device is located within the first communication range of the first device.

2. The method of claim 1, wherein controlling the first device to scan for at least one signal transmitted by other devices based on receiving the first user input comprises:
displaying, on the user interface, an animation providing information indicating that the first device is searching for at least one signal transmitted by other devices using the first communication protocol.

3. The method of claim 2, comprising:
based on determining the credential information that identifies the credential issued to the user of the second device, displaying the credential information on the user interface; and
presenting a smaller version of the animation on the user interface in conjunction with displaying the credential information.

4. The method of claim 1, wherein the validation server is remotely located, and wherein validating the credential information by communicating with the validation server comprises:
sending, by the first device, the credential information to the validation server over a network connection; and
receiving, at the first device and from the validation server, a response indicating that the credential information is actively associated with the validation system, wherein the response includes additional information identifying the user of the second device with whom the credential information is uniquely associated.

5. The method of claim 4, comprising:
discovering, by the first device and based on controlling the first device to scan within the first communication range using the first communication protocol, additional devices in the within the first communication range that are associated with the validation system;
displaying, on the user interface, information indicating that additional devices are discovered, along with displaying the credential information that is uniquely associated with the user of the second device;
receiving, at the first device and from the additional devices, additional signals that were broadcast by the additional devices;
determining, based on the additional signals that were broadcast by the additional devices, (i) additional identifiers that are uniquely associated with the additional devices on the network using the first communication protocol, and (ii) additional credential information that are uniquely associated with additional users of the additional devices on the validation system;
validating, by the first device, the additional credential information by communicating with the validation server; and
based on validating the additional credential information, displaying, by the first device, thumbnails associated with the additional credential information corresponding to the additional users of the additional devices, along with displaying the credential information that is uniquely associated with the user of the second device.

6. The method of claim 5, wherein displaying the information indicating that additional devices are discovered comprises:
displaying placeholder icons on the user interface adjacent to the displayed credential information that is uniquely associated with the user of the second device; and
providing information on a number of the additional devices discovered.

7. The method of claim 6, wherein the number of the additional devices discovered is limited to a predetermined number, the method comprising:
determining, by the first device, that the number of the additional devices discovered has reached the predetermined number; and based on determining that the number of the additional devices discovered has reached the predetermined number, controlling the first device to cease scanning the first communication range.

8. The method of claim 1, comprising:
based on the scan, discovering, by the first device, a third device that is located within the first communication range of the first device and that is broadcasting, over the first communication protocol, a third signal;
receiving, at the first device and from the third device, the third signal that was broadcast by the third device using the first communication protocol;
determining, based on the third signal that was broadcast by the third device, (i) a third identifier that is uniquely associated with the third device on the network using the first communication protocol, (ii) third credential information that is uniquely associated with a user of the third device on the validation system, and (iii) additional information identifying the user of the third device;
determining, by the first device, that a network connection with the validation server cannot be established;
based on determining that the network connection with the validation server cannot be established, validating, by the first device, the third credential information that is uniquely associated with the user of the third device on the validation system by using the third credential information that is uniquely associated with the user of the third device on the validation system; and
based on validating the third credential information, displaying, by the first device, the third credential information on the user interface.

9. The method of claim 1, comprising:
receiving, through the user interface, a new user input that initiates another search for other devices that are associated with the validation system and that are located within the first communication range of the first device that enables exchange, with the first device, of direct wireless communications using the first communication protocol;
based on receiving the new user input, controlling the first device to scan, using the first communication protocol, for other devices that are located within the first communication range of the first device that enables exchange, with the first device, of direct wireless communications using the first communication protocol;
based on the scan, determining, by the first device, that there are no other devices associated with the validation system in the first communication range;
displaying, by the first device and on the user interface, information indicating that no other devices associated with the validation system are found in the first communication range;
receiving, through the user interface, a second user input that initiates a new search for other devices that are associated with the validation system and that are located in a geographic area within a second communication range of the first device that is greater than the first communication range;
based on receiving the second user input, controlling the first device to send a message to the validation server, using a second communication protocol, the message including a request for information about users of other devices associated with the validation system located in the geographic area within the second communication range of the first device;
receiving, at the first device, a response from the validation server, the response including information about users of other devices associated with the validation system that are located in the geographic area within the second communication range of the first device; and
displaying, by the first device, the received information about the users of the other devices on the user interface.

10. The method of claim 9, wherein the first user input is received through a first panel of the user interface presented on the display coupled to the first device, the first panel associated with the first communication protocol, and wherein receiving the second user input comprises:
in response to displaying the information indicating that no users of other devices are found in the first communication range of the first device, receiving another user input for switching to a second panel of the user interface, the second panel associated with the second communication protocol;
presenting the second panel of the user interface on the display coupled to the first device upon receiving the other user input; and
receiving the second user input through the second panel of the user interface.

11. The method of claim 9, wherein receiving the response from the validation server including information about users of other devices comprises:
receiving information about users associated with devices that have corresponding locations recorded with the validation server within a predetermined time period from a time of sending the request by the first device, wherein information received about a user includes one or more of an image associated with the user, a name of the user, a title, location of the associated device last recorded with the validation server along with time and date of the location, or a distance of the associated device from the first device.

12. The method of claim 11, wherein the information about the users is received sorted by distance from the first device, with information about users associated with devices that are closer to the first device received before information about users associated with devices that are farther away from the first device are received.

13. The method of claim 11, wherein displaying the received information about the users of other devices comprises:
displaying, on the user interface, a map of the geographic area corresponding to the second communication range; and
presenting, on the map, thumbnails of the images associated with the users included in the received information from the validation server, wherein the thumbnails are shown on the map proximate to the recorded locations of the associated devices.

14. The method of claim 13, comprising:
receiving a third user input selecting a thumbnail from the thumbnails presented on the map; and
in response to receiving the third user input, displaying, as an overlay covering the map, an enlarged representation of the image associated with the user corresponding to the selected thumbnail, along with one or more of the name of the user, the title, last recorded location of the associated device and time and date of the location, or the distance of the associated device from the first device.

15. The method of claim 13, wherein presenting thumbnails of the images associated with the users comprises:

determining that there are multiple users with recorded locations that are within a predetermined proximity range of one another;

based on determining that there are multiple users, selecting one user among the multiple users; and presenting a thumbnail of the image associated with the selected user on the map proximate to the recorded location of the associated device, along with an icon providing a numerical indication of the multiple users who are within the predetermined proximity range of the selected user indicated by the thumbnail.

16. The method of claim 15, comprising:

receiving a third user input selecting the thumbnail associated with the selected user; and in response to receiving the third user input, displaying, as an overlay covering the map, an enlarged representation of the image associated with the selected user and the information received about the selected user, along with information on others of the multiple users indicated by the icon.

17. The method of claim 16, wherein the information on others of the multiple users indicated by the icon includes thumbnails of images associated with the others of the multiple users, and wherein the method comprises:

receiving a fourth user input selecting a new thumbnail from the thumbnails of images associated with the others of the multiple users; and in response to receiving the fourth user input, replacing previous enlarged representation of the image and the information received about the selected user, with an enlarged representation of the image and the information received about the user corresponding to the new thumbnail, along with displaying information on remainder of the multiple users.

18. The method of claim 13, wherein the first communication protocol includes a personal area network (PAN) communication protocol and the second communication protocol includes a wide area network (WAN) communication protocol.

19. The method of claim 1, wherein:

the first communication protocol is a Bluetooth-based communication protocol, the identifier that is uniquely associated with the second device on the network includes one or more Universally Unique Identifiers (UUIDs), and the credential information that is uniquely associated with the user of the second device on the validation system includes a combination of one or more UUIDs, selected from among a subset of possible UUIDs.

20. The method of claim 1, comprising:

providing, to the validation server, a representation of a credential of the first user that is issued by the credential authority; and receiving, from the validation server, identification information for the user of the second device selected based on one or more permissions that the credential of the first user indicates are granted to the first user.

21. One or more non-transitory computer-readable media storing instructions executable by one or more processors that, upon execution, cause the one or more processors to perform operations comprising:

presenting, by a first device of a first user, a user interface on a display coupled to the first device, wherein the user interface is provided using an application associated with a validation system used by the first device;

receiving, through the user interface, a first user input that initiates a search for other devices that are associated with the validation system and that are located within a first communication range of the first device that enables exchange, with the first device, of direct wireless communications using a first communication protocol;

based on receiving the first user input, controlling the first device to scan, using the first communication protocol, for at least one signal transmitted by other devices that are located within the first communication range of the first device that enables exchange, with the first device, of direct wireless communications using the first communication protocol;

based on the scan, detecting, by the first device, a signal from a second device that is located within the first communication range of the first device and that is broadcasting the signal according to the first communication protocol, the signal from the second device including a representation of a credential issued to a user of the second device by a credential authority that issued a first credential to the first user;

determining, based on the representation of the credential of the user of the second device included in the signal from the second device and by the first device, (i) an identifier that is uniquely associated with the second device on a network using the first communication protocol, and (ii) credential information that identifies the credential issued to the user of the second device by the credential authority;

validating, by the first device, the second device by verifying that the identifier that is uniquely associated with the second device corresponds to identification information for the user of the second device;

validating, by the first device, the credential information that identifies the credential issued to the user of the second device by the credential authority by communicating with a validation server associated with the validation system to verify that (i) the credential was issued by the credential authority and (ii) the credential is currently active; and based on validating the credential information, displaying, by the first device, an indication that the second device is located within the first communication range of the first device.

22. An electronic device comprising:

one or more processors; and one or more machine-readable media storing instructions that, when executed, cause the electronic device to perform operations comprising:

presenting, by a first device of a first user, a user interface on a display coupled to the first device, wherein the user interface is provided using an application associated with a validation system used by the first device;

receiving, through the user interface, a first user input that initiates a search for other devices that are associated with the validation system and that are located within a first communication range of the first device that enables exchange, with the first device, of direct wireless communications using a first communication protocol;

based on receiving the first user input, controlling the first device to scan, using the first communication protocol, for at least one signal transmitted by other devices that are located within the first communication range of the first device that enables exchange, with the first device, of direct wireless communications using the first communication protocol;

based on the scan, detecting, by the first device, a signal from a second device that is located within the first communication range of the first device and that is broadcasting the signal according to the first communication protocol, the signal from the second device including a representation of a credential issued to a user of the second device by a credential authority that issued a first credential to the first user;

determining, based on the representation of the credential of the user of the second device included in the signal from the second device and by the first device, (i) an identifier that is uniquely associated with the second device on a network using the first communication protocol, and (ii) credential information that identifies the credential issued to the user of the second device by the credential authority;

validating, by the first device, the second device by verifying that the identifier that is uniquely associated with the second device corresponds to identification information for the user of the second device;

validating, by the first device, the credential information that identifies the credential issued to the user of the second device by the credential authority, by communicating with a validation server associated with the validation system to verify that (i) the credential was issued by the credential authority and (ii) the credential is currently active; and based on validating the credential information, displaying, by the first device, an indication that the second device is located within the first communication range of the first device.

\* \* \* \* \*

UNITED STATES PATENT AND TRADEMARK OFFICE
CERTIFICATE OF CORRECTION

PATENT NO. : 10,382,282 B1
APPLICATION NO. : 14/793488
DATED : August 13, 2019
INVENTOR(S) : Guy Levy-Yurista, Diego Valenzuela and Liang Liu It is certified that error appears in the above-identified patent and that said Letters Patent is hereby corrected as shown below:

In the Specification

Column 2, under "SUMMARY", Lines 55-56, delete "devices in the within the first" and insert --devices within the first--.

In the Claims

In Claim 5, Column 52, Line 28, delete "devices in the within the first" and insert --devices within the first--.

Signed and Sealed this
Eighth Day of October, 2019

Andrei Iancu
*Director of the United States Patent and Trademark Office*